US011523297B2

(12) United States Patent
Zhou et al.

(10) Patent No.: US 11,523,297 B2
(45) Date of Patent: Dec. 6, 2022

(54) SINR-BASED GROUP BEAM REPORTING

(71) Applicant: QUALCOMM Incorporated, San Diego, CA (US)

(72) Inventors: Yan Zhou, San Diego, CA (US); Kiran Venugopal, Raritan, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 48 days.

(21) Appl. No.: 17/314,757

(22) Filed: May 7, 2021

(65) Prior Publication Data
US 2021/0352503 A1 Nov. 11, 2021

Related U.S. Application Data

(60) Provisional application No. 63/022,139, filed on May 8, 2020.

(51) Int. Cl.
*H04B 7/0408* (2017.01)
*H04B 7/06* (2006.01)
(Continued)

(52) U.S. Cl.
CPC .......... *H04W 24/10* (2013.01); *H04B 7/0408* (2013.01); *H04B 7/0695* (2013.01);
(Continued)

(58) Field of Classification Search
CPC .. H04B 7/02–12; H04B 17/0082–3913; H04B 5/0001–26; H04J 11/0023–0093; H04J 2011/0003–0096; H04L 5/0001–26; H04W 8/22–245; H04W 16/28; H04W 24/02–10; H04W 28/02–26; H04W 36/0005–385; H04W 48/02–20; H04W 72/005–14; H04W 74/002–008; H04W 84/02–16;
(Continued)

(56) References Cited

U.S. PATENT DOCUMENTS

2019/0305838 A1* 10/2019 Davydov ............. H04B 7/0695
2020/0021336 A1* 1/2020 Da Silva ............. H04B 7/0695
(Continued)

*Primary Examiner* — Timothy J Weidner
(74) *Attorney, Agent, or Firm* — Arent Fox LLP/Qualcomm Incorporated

(57) ABSTRACT

The present disclosure relates to apparatus and methods of signal to interference and noise ratio (SINR)-based group beam reporting. In particular, this disclosure relates to measurement report configurations for initiating a protocol layer 1 (L1)-SINR based group beam report, and corresponding measurement resource transmissions by a base station and measurement and reporting actions of the UE to report the L1-SINR for each of at least two beams that can be simultaneously received. The measurement report configurations include a channel measurement resource (CMR) configuration, an interference measurement resource (IMR) configuration, or both. The measurement configuration may indicate a plurality of CMR repetition sets, or N resource sets of 1 CMR resource plus N−1 IMRs, e.g., 1 CMR mapped to N−1 IMRs, or N×(N−1) resource sets of a CMR and an IMR, e.g., 1 CMR mapped to 1 IMR, where N is the number of candidate Tx beams.

25 Claims, 12 Drawing Sheets

(51) Int. Cl.
*H04B 7/08* (2006.01)
*H04B 17/24* (2015.01)
*H04B 17/336* (2015.01)
*H04B 17/345* (2015.01)
*H04W 16/28* (2009.01)
*H04W 24/08* (2009.01)
*H04W 24/10* (2009.01)
*H04W 72/04* (2009.01)
*H04W 72/08* (2009.01)
*H04W 84/02* (2009.01)
*H04W 88/02* (2009.01)
*H04W 88/08* (2009.01)
*H04W 92/02* (2009.01)
*H04W 92/10* (2009.01)

(52) U.S. Cl.
CPC ............. *H04B 7/088* (2013.01); *H04B 17/24* (2015.01); *H04B 17/336* (2015.01); *H04B 17/345* (2015.01); *H04W 16/28* (2013.01); *H04W 24/08* (2013.01); *H04W 72/0406* (2013.01); *H04W 72/046* (2013.01); *H04W 72/082* (2013.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ........... H04W 88/02–12; H04W 92/02; H04W 92/04; H04W 92/10
See application file for complete search history.

(56) References Cited

U.S. PATENT DOCUMENTS

| | | | |
|---|---|---|---|
| 2021/0211176 A1* | 7/2021 | Gao | H04W 24/10 |
| 2022/0116167 A1* | 4/2022 | Wang | H04W 24/10 |
| 2022/0140960 A1* | 5/2022 | Gao | H04W 24/10 |

* cited by examiner

|  | Tx beam 1 | Tx beam 2 | Tx beam 3 | Tx beam 4 | Tx beam 5 | Tx beam 6 |
|---|---|---|---|---|---|---|
| Rx beam 1 | RSRP 1-1 | RSRP 2-1 | ⋮ | ⋮ | ⋮ | RSRP 6-1 |
| Rx beam 2 | RSRP 1-2 | RSRP 2-2 | ⋮ | ⋮ | ⋮ | RSRP 6-2 |
| Rx beam 3 | ⋮ | ⋮ | ⋮ | ⋮ | ⋮ | ⋮ |
| Rx beam 4 | ⋮ | ⋮ | ⋮ | ⋮ | ⋮ | ⋮ |
| Rx beam 5 | ⋮ | ⋮ | ⋮ | ⋮ | ⋮ | ⋮ |
| Rx beam 6 | RSRP 1-6 | RSRP 2-6 | ⋮ | ⋮ | ⋮ | RSRP 6-6 |

| | Tx beam 1 | Tx beam 2 | Tx beam 3 | Tx beam 4 | Tx beam 5 | Tx beam 6 |
|---|---|---|---|---|---|---|
| Rx beam 1 | RSRP 1-1 | RSRP 2-1 | ⋮ | ⋮ | ⋮ | RSRP 6-1 |
| Rx beam 2 | RSRP 1-2 | RSRP 2-2 | ⋮ | ⋮ | ⋮ | RSRP 6-2 |
| Rx beam 3 | ⋮ | ⋮ | ⋮ | ⋮ | ⋮ | ⋮ |
| Rx beam 4 | ⋮ | ⋮ | ⋮ | ⋮ | ⋮ | ⋮ |
| Rx beam 5 | ⋮ | ⋮ | ⋮ | ⋮ | ⋮ | ⋮ |
| Rx beam 6 | RSRP 1-6 | RSRP 2-6 | ⋮ | ⋮ | ⋮ | RSRP 6-6 |

CMR rep. set 1, CMR rep. set 2, ..., CMR rep. set 6

| | Tx beam 1 | Tx beam 2 | Tx beam 3 | Tx beam 4 | Tx beam 5 | Tx beam 6 |
|---|---|---|---|---|---|---|
| Rx beam 1 | RSRP 1-1 | RSRP 2-1 | ⋮ | ⋮ | ⋮ | RSRP 6-1 |
| Rx beam 2 | RSRP 1-2 | RSRP 2-2 | ⋮ | ⋮ | ⋮ | RSRP 6-2 |
| Rx beam 3 | ⋮ | ⋮ | ⋮ | ⋮ | ⋮ | ⋮ |
| Rx beam 4 | ⋮ | ⋮ | ⋮ | ⋮ | ⋮ | ⋮ |
| Rx beam 5 | ⋮ | ⋮ | ⋮ | ⋮ | ⋮ | ⋮ |
| Rx beam 6 | RSRP 1-6 | RSRP 2-6 | ⋮ | ⋮ | ⋮ | RSRP 6-6 |

Resource set 1, Resource set 2, ..., Resource set 6

FIG. 7

SINR-BASED GROUP BEAM REPORTING

CROSS-REFERENCE TO RELATED APPLICATIONS

The present application claims the benefit of priority of U.S. Provisional Patent Application No. 63/022,139 filed on May 8, 2020, which is incorporated by reference herein in its entirety.

BACKGROUND

Technical Field

The present disclosure relates generally to communication systems, and more particularly, to apparatus and methods of signal to interference and noise ratio (SINR)-based group beam reporting.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies. In particular, improving network communication procedures is desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of wireless communication at a user equipment (UE), comprising receiving a channel measurement resource (CMR) configuration including a plurality of CMR repetition sets equal to a total number of candidate transmit beams, wherein each CMR repetition set of the plurality of CMR repetition sets indicates a repetition set-specific CMR and a repetition set-specific transmit beam identifier of a candidate transmit beam from the total number of candidate transmit beams. The method further includes measuring a received power of the repetition set-specific CMR at each of a plurality of receive beams for each of the plurality of CMR repetition sets, wherein the plurality of receive beams respectively correspond to the total number of candidate transmit beams. Additionally, the method further includes determining a signal to interference and noise ratio (SINR) for each of a plurality of beam pairs of the total number of candidate transmit beams and the plurality of receive beams, based on the received power of the repetition set-specific CMR at each of the plurality of receive beams for each of the plurality of CMR repetition sets. Additionally, the method further includes selecting two beam pairs from the plurality of beam pairs having a SINR property. Additionally, the method further includes reporting the repetition set-specific transmit beam identifier of the candidate transmit beam, and the SINR, for each of the two beam pairs.

Another example implementation includes an apparatus for wireless communication at a user equipment (UE), comprising a memory, a transceiver, and a processor coupled with the memory and the transceiver. The processor is configured to receive, via the transceiver, a channel measurement resource (CMR) configuration including a plurality of CMR repetition sets equal to a total number of candidate transmit beams, wherein each CMR repetition set of the plurality of CMR repetition sets indicates a repetition set-specific CMR and a repetition set-specific transmit beam identifier of a candidate transmit beam from the total number of candidate transmit beams. The processor is further configured to measure a received power of the repetition set-specific CMR at each of a plurality of receive beams for each of the plurality of CMR repetition sets, wherein the plurality of receive beams respectively correspond to the total number of candidate transmit beams. Additionally, the processor further configured to determine a signal to interference and noise ratio (SINR) for each of a plurality of beam pairs of the total number of candidate transmit beams and the plurality of receive beams, based on the received power of the repetition set-specific CMR at each of the plurality of receive beams for each of the plurality of CMR repetition sets. Additionally, the processor further configured to select two beam pairs from the plurality of beam pairs having a SINR property. Additionally, the processor further configured to report, via the transceiver, the repetition set-specific transmit beam identifier of the candidate transmit beam, and the SINR, for each of the two beam pairs.

Another example implementation includes an apparatus for wireless communication at a user equipment (UE), comprising means for receiving a channel measurement resource (CMR) configuration including a plurality of CMR repetition sets equal to a total number of candidate transmit beams, wherein each CMR repetition set of the plurality of CMR repetition sets indicates a repetition set-specific CMR and a repetition set-specific transmit beam identifier of a candidate transmit beam from the total number of candidate transmit beams. The apparatus further includes means for measuring a received power of the repetition set-specific CMR at each of a plurality of receive beams for each of the plurality of CMR repetition sets, wherein the plurality of receive beams respectively correspond to the total number of candidate transmit beams. Additionally, the apparatus further includes means for determining a signal to interference and noise ratio (SINR) for each of a plurality of beam pairs of the total number of candidate transmit beams and the plurality of receive beams, based on the received power of the repetition set-specific CMR at each of the plurality of receive beams for each of the plurality of CMR repetition sets. Additionally, the apparatus further includes means for selecting two beam pairs from the plurality of beam pairs having a SINR property. Additionally, the apparatus further includes means for reporting the repetition set-specific transmit beam identifier of the candidate transmit beam, and the SINR, for each of the two beam pairs.

Another example implementation includes a computer-readable medium comprising stored instructions for wireless communication at a user equipment (UE), executable by a processor to receive a channel measurement resource (CMR) configuration including a plurality of CMR repetition sets equal to a total number of candidate transmit beams, wherein each CMR repetition set of the plurality of CMR repetition sets indicates a repetition set-specific CMR and a repetition set-specific transmit beam identifier of a candidate transmit beam from the total number of candidate transmit beams. The instructions are further executable to measure a received power of the repetition set-specific CMR at each of a plurality of receive beams for each of the plurality of CMR repetition sets, wherein the plurality of receive beams respectively correspond to the total number of candidate transmit beams. Additionally, the instructions are further executable to determine a signal to interference and noise ratio (SINR) for each of a plurality of beam pairs of the total number of candidate transmit beams and the plurality of receive beams, based on the received power of the repetition set-specific CMR at each of the plurality of receive beams for each of the plurality of CMR repetition sets. Additionally, the instructions are further executable to select two beam pairs from the plurality of beam pairs having a SINR property. Additionally, the instructions are further executable to report the repetition set-specific transmit beam identifier of the candidate transmit beam, and the SINR, for each of the two beam pairs.

An example implementation includes a method of wireless communication at a user equipment (UE), comprising receiving a measurement resource configuration indicating a plurality of resource sets each having a resource set-specific channel measurement resource (CMR) and a plurality of resource set-specific interference measurement resources (IMRs), wherein a number of the plurality of resource sets are equal to a total number of candidate transmit beams, wherein each resource set-specific CMR corresponds to a resource set-specific CMR transmit beam identifier of a plurality of transmit beam identifiers of the total number of candidate transmit beams, wherein the plurality of resource set-specific IMRs correspond to a resource set-specific plurality of remaining transmit beam identifiers of the plurality of transmit beam identifiers. The method further includes measuring a received power of the resource set-specific CMR and of the plurality of resource set-specific IMRs at a resource set-specific receive beam of a plurality of receive beams for each of the plurality of resource sets, wherein each resource set-specific receive beam corresponds to the resource set-specific transmit beam identifier of the candidate transmit beam for each of the plurality of resource sets, wherein the plurality of receive beams respectively correspond to the total number of candidate transmit beams.

Additionally, the method further includes determining a signal to interference and noise ratio (SINR) for each of a plurality of beam pairs of the resource set-specific transmit beam and the plurality of remaining transmit beams for each of the plurality of resource sets, based on the received power of the resource set-specific CMR and of the plurality of resource set-specific IMRs for each of the plurality of resource sets. Additionally, the method further includes selecting two beam pairs from the plurality of beam pairs having a SINR property. Additionally, the method further includes reporting the resource set-specific CMR transmit beam identifier and the SINR for each of the two beam pairs.

Another example implementation includes an apparatus for wireless communication at a user equipment (UE), comprising a memory, a transceiver, and a processor coupled with the memory and the transceiver. The processor is configured to receive, via the transceiver, a measurement resource configuration indicating a plurality of resource sets each having a resource set-specific channel measurement resource (CMR) and a plurality of resource set-specific interference measurement resources (IMRs), wherein a number of the plurality of resource sets are equal to a total number of candidate transmit beams, wherein each resource set-specific CMR corresponds to a resource set-specific CMR transmit beam identifier of a plurality of transmit beam identifiers of the total number of candidate transmit beams, wherein the plurality of resource set-specific IMRs correspond to a resource set-specific plurality of remaining transmit beam identifiers of the plurality of transmit beam identifiers. The processor is further configured to measure a received power of the resource set-specific CMR and of the plurality of resource set-specific IMRs at a resource set-specific receive beam of a plurality of receive beams for each of the plurality of resource sets, wherein each resource set-specific receive beam corresponds to the resource set-specific transmit beam identifier of the candidate transmit beam for each of the plurality of resource sets, wherein the plurality of receive beams respectively correspond to the total number of candidate transmit beams. Additionally, the processor further configured to determine a signal to interference and noise ratio (SINR) for each of a plurality of beam pairs of the resource set-specific transmit beam and the plurality of remaining transmit beams for each of the plurality of resource sets, based on the received power of the resource set-specific CMR and of the plurality of resource set-specific IMRs for each of the plurality of resource sets. Additionally, the processor further configured to select two beam pairs from the plurality of beam pairs having a SINR property. Additionally, the processor further configured to report, via the transceiver, the resource set-specific CMR transmit beam identifier and the SINR for each of the two beam pairs.

Another example implementation includes an apparatus for wireless communication at a user equipment (UE), comprising means for receiving a measurement resource configuration indicating a plurality of resource sets each having a resource set-specific channel measurement resource (CMR) and a plurality of resource set-specific interference measurement resources (IMRs), wherein a number of the plurality of resource sets are equal to a total number of candidate transmit beams, wherein each resource set-specific CMR corresponds to a resource set-specific CMR transmit beam identifier of a plurality of transmit beam identifiers of the total number of candidate transmit beams, wherein the plurality of resource set-specific IMRs correspond to a resource set-specific plurality of remaining transmit beam identifiers of the plurality of transmit beam identifiers. The apparatus further includes means for measuring a received power of the resource set-specific CMR and of the plurality of resource set-specific Milts at a resource set-specific receive beam of a plurality of receive beams for each of the plurality of resource sets, wherein each resource set-specific receive beam corresponds to the resource set-specific transmit beam identifier of the candidate transmit beam for each of the plurality of resource sets, wherein the plurality of receive beams respectively correspond to the total number of candidate transmit beams. Additionally, the apparatus further includes means for determining a signal to interference and noise ratio (SINR) for each of a plurality of beam pairs of the resource set-specific transmit beam and the plurality of remaining transmit beams for each of the plurality of resource sets, based on the received power of the resource set-specific CMR and of the plurality of resource set-specific IMRs for each of the plurality of resource sets. Additionally, the apparatus further includes means for selecting two beam pairs from the plurality of beam pairs having a SINR property. Additionally, the apparatus further includes means for reporting the resource set-specific CMR transmit beam identifier and the SINR for each of the two beam pairs.

Another example implementation includes a computer-readable medium comprising stored instructions for wireless communication at a user equipment (UE), executable by a processor to receive a measurement resource configuration indicating a plurality of resource sets each having a resource set-specific channel measurement resource (CMR) and a plurality of resource set-specific interference measurement resources (IMRs), wherein a number of the plurality of resource sets are equal to a total number of candidate transmit beams, wherein each resource set-specific CMR corresponds to a resource set-specific CMR transmit beam identifier of a plurality of transmit beam identifiers of the total number of candidate transmit beams, wherein the plurality of resource set-specific IMRs correspond to a resource set-specific plurality of remaining transmit beam identifiers of the plurality of transmit beam identifiers. The instructions are further executable to measure a received power of the resource set-specific CMR and of the plurality of resource set-specific IMRs at a resource set-specific receive beam of a plurality of receive beams for each of the plurality of resource sets, wherein each resource set-specific receive beam corresponds to the resource set-specific transmit beam identifier of the candidate transmit beam for each of the plurality of resource sets, wherein the plurality of receive beams respectively correspond to the total number of candidate transmit beams. Additionally, the instructions are further executable to determine a signal to interference and noise ratio (SINR) for each of a plurality of beam pairs of the resource set-specific transmit beam and the plurality of remaining transmit beams for each of the plurality of resource sets, based on the received power of the resource set-specific CMR and of the plurality of resource set-specific IMRs for each of the plurality of resource sets. Additionally, the instructions are further executable to select two beam pairs from the plurality of beam pairs having a SINR property. Additionally, the instructions are further executable to report the resource set-specific CMR transmit beam identifier and the SINR for each of the two beam pairs.

An example implementation includes a method of wireless communication at a user equipment (UE), comprising receiving a measurement resource configuration indicating a plurality of resource sets each having a resource set-specific channel measurement resource (CMR) and a resource set-specific interference measurement resources (IMR), wherein a number of the plurality of resource sets are equal to (a total number (N) of candidate transmit beams)×(N−1), wherein each resource set-specific CMR corresponds to a resource set-specific first candidate transmit beam having a resource set-specific first transmit beam identifier of a plurality of transmit beam identifiers of the total number of candidate transmit beams, wherein the resource set-specific IMR corresponds to a resource set-specific second candidate transmit beam having a resource set-specific second transmit beam identifier of the plurality of transmit beam identifiers. The method further includes measuring, for each of the plurality of resource sets, a received power of the resource set-specific CMR and a received power of the resource set-specific IMR at a resource set-specific first receive beam of a plurality of receive beams, wherein each resource set-specific first receive beam corresponds to the resource set-specific first transmit beam identifier of the resource set-specific first candidate transmit beam for each of the plurality of resource sets, wherein the plurality of receive beams respectively correspond to the total number of candidate transmit beams. Additionally, the method further includes determining, for each of the plurality of resource sets, a signal to interference and noise ratio (SINR) for each of a plurality of beam pairs of the resource set-specific first transmit beam and the resource set-specific second transmit beam, based on the received power of the resource set-specific CMR at the resource set-specific first receive beam and based on the received power of the resource set-specific IMR at the resource set-specific first receive beam for each of the plurality of resource sets. Additionally, the method further includes selecting two beam pairs from the plurality of beam pairs having a SINR property. Additionally, the method further includes reporting the resource set-specific transmit beam identifier and the SINR for each of the two beam pairs.

Another example implementation includes an apparatus for wireless communication at a user equipment (UE), comprising a memory, a transceiver, and a processor coupled with the memory and the transceiver. The processor is configured to receive, via the transceiver, a measurement resource configuration indicating a plurality of resource sets each having a resource set-specific channel measurement resource (CMR) and a resource set-specific interference measurement resources (IMR), wherein a number of the plurality of resource sets are equal to (a total number (N) of candidate transmit beams)×(N−1), wherein each resource set-specific CMR corresponds to a resource set-specific first candidate transmit beam having a resource set-specific first transmit beam identifier of a plurality of transmit beam identifiers of the total number of candidate transmit beams, wherein the resource set-specific IMR corresponds to a resource set-specific second candidate transmit beam having a resource set-specific second transmit beam identifier of the plurality of transmit beam identifiers. The processor is further configured to measure, for each of the plurality of resource sets, a received power of the resource set-specific CMR and a received power of the resource set-specific IMR at a resource set-specific first receive beam of a plurality of receive beams, wherein each resource set-specific first receive beam corresponds to the resource set-specific first transmit beam identifier of the resource set-specific first candidate transmit beam for each of the plurality of resource sets, wherein the plurality of receive beams respectively correspond to the total number of candidate transmit beams. Additionally, the processor further configured to determine, for each of the plurality of resource sets, a signal to interference and noise ratio (SINR) for each of a plurality of beam pairs of the resource set-specific first transmit beam and the resource set-specific second transmit beam, based on the received power of the resource set-specific CMR at the resource set-specific first receive beam and based on the received power of the resource set-specific IMR at the resource set-specific first receive beam for each of the plurality of resource sets. Additionally, the processor further configured to select two beam pairs from the plurality of beam pairs having a SINR property. Additionally, the processor further configured to report, via the transceiver, the resource set-specific transmit beam identifier and the SINR for each of the two beam pairs.

Another example implementation includes an apparatus for wireless communication at a user equipment (UE), comprising means for receiving a measurement resource configuration indicating a plurality of resource sets each having a resource set-specific channel measurement resource (CMR) and a resource set-specific interference measurement resources (IMR), wherein a number of the plurality of resource sets are equal to (a total number (N) of candidate transmit beams)×(N−1), wherein each resource set-specific CMR corresponds to a resource set-specific first candidate transmit beam having a resource set-specific first transmit beam identifier of a plurality of transmit beam identifiers of the total number of candidate transmit beams, wherein the resource set-specific IMR corresponds to a resource set-specific second candidate transmit beam having a resource set-specific second transmit beam identifier of the plurality of transmit beam identifiers. The apparatus further includes means for measuring, for each of the plurality of resource sets, a received power of the resource set-specific CMR and a received power of the resource set-specific IMR at a resource set-specific first receive beam of a plurality of receive beams, wherein each resource set-specific first receive beam corresponds to the resource set-specific first transmit beam identifier of the resource set-specific first candidate transmit beam for each of the plurality of resource sets, wherein the plurality of receive beams respectively correspond to the total number of candidate transmit beams. Additionally, the apparatus further includes means for determining, for each of the plurality of resource sets, a signal to interference and noise ratio (SINR) for each of a plurality of beam pairs of the resource set-specific first transmit beam and the resource set-specific second transmit beam, based on the received power of the resource set-specific CMR at the resource set-specific first receive beam and based on the received power of the resource set-specific IMR at the resource set-specific first receive beam for each of the plurality of resource sets. Additionally, the apparatus further includes means for selecting two beam pairs from the plurality of beam pairs having a SINR property. Additionally, the apparatus further includes means for reporting the resource set-specific transmit beam identifier and the SINR for each of the two beam pairs.

Another example implementation includes a computer-readable medium comprising stored instructions for wireless communication at a user equipment (UE), executable by a processor to receive a measurement resource configuration indicating a plurality of resource sets each having a resource set-specific channel measurement resource (CMR) and a resource set-specific interference measurement resources (IMR), wherein a number of the plurality of resource sets are equal to (a total number (N) of candidate transmit beams)×(N−1), wherein each resource set-specific CMR corresponds to a resource set-specific first candidate transmit beam having a resource set-specific first transmit beam identifier of a plurality of transmit beam identifiers of the total number of candidate transmit beams, wherein the resource set-specific IMR corresponds to a resource set-specific second candidate transmit beam having a resource set-specific second transmit beam identifier of the plurality of transmit beam identifiers. The instructions are further executable to measure, for each of the plurality of resource sets, a received power of the resource set-specific CMR and a received power of the resource set-specific IMR at a resource set-specific first receive beam of a plurality of receive beams, wherein each resource set-specific first receive beam corresponds to the resource set-specific first transmit beam identifier of the resource set-specific first candidate transmit beam for each of the plurality of resource sets, wherein the plurality of receive beams respectively correspond to the total number of candidate transmit beams. Additionally, the instructions are further executable to determine, for each of the plurality of resource sets, a signal to interference and noise ratio (SINR) for each of a plurality of beam pairs of the resource set-specific first transmit beam and the resource set-specific second transmit beam, based on the received power of the resource set-specific CMR at the resource set-specific first receive beam and based on the received power of the resource set-specific IMR at the resource set-specific first receive beam for each of the plurality of resource sets. Additionally, the instructions are further executable to select two beam pairs from the plurality of beam pairs having a SINR property. Additionally, the instructions are further executable to report the resource set-specific transmit beam identifier and the SINR for each of the two beam pairs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5 is a reference signal received power table indicating a combination of transmit (Tx) beams and receive (Rx) beams, according to aspects described herein.

FIG. 6 is a reference signal received power table, indicating a combination of Tx beams and Rx beams, for a first option measurement configuration according to aspects described herein.

FIG. 7 is a reference signal received power table, indicating a combination of Tx beams and Rx beams, for a second option measurement configuration according to aspects described herein.

DETAILED DESCRIPTION

Figure 1:
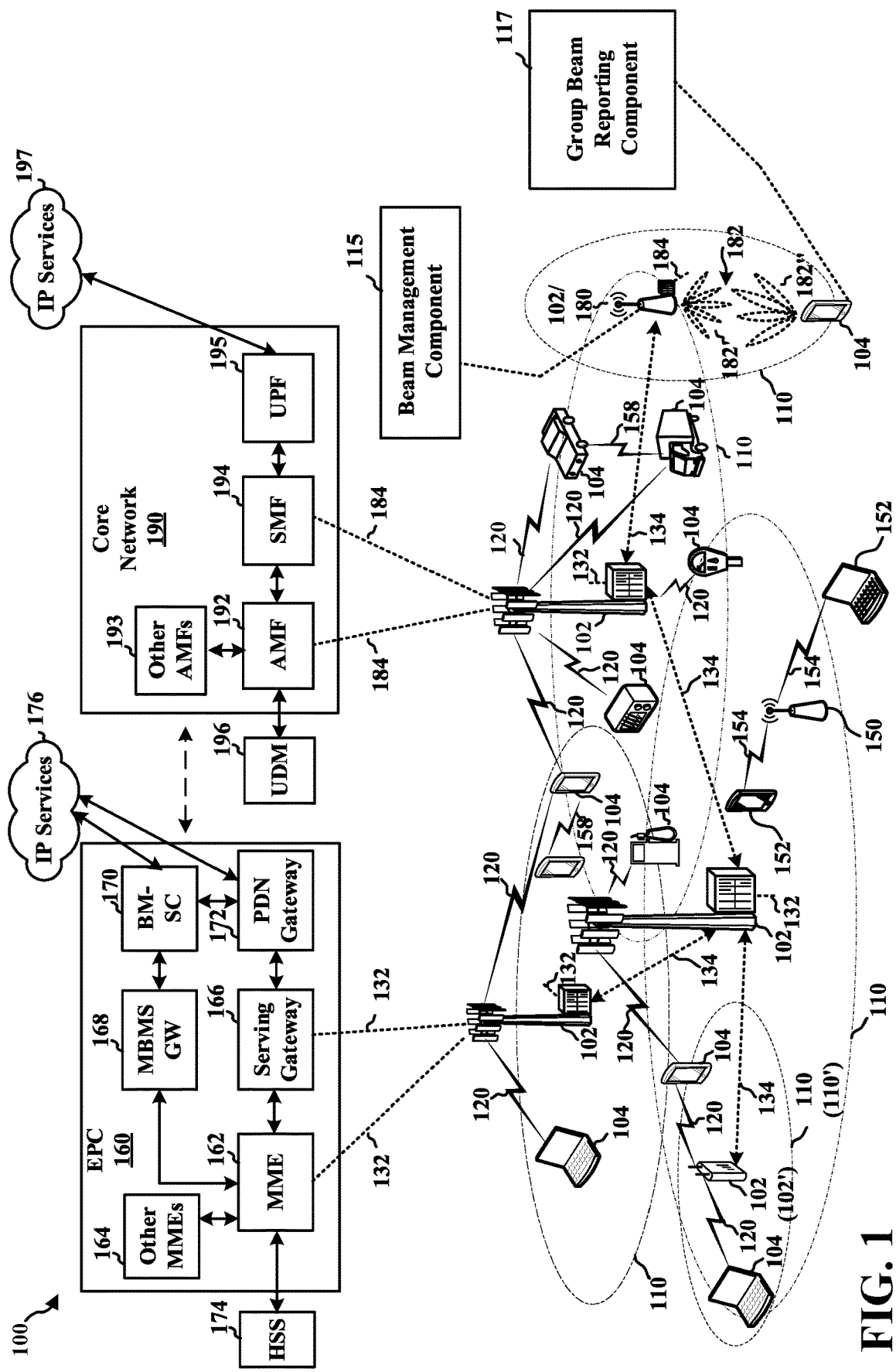
FIG. 1 is a diagram of an example of a wireless communications system and an access network, including base stations and user equipment (UEs) configured to perform aspects as described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present disclosure relates generally to wireless communication systems, and more particularly, to apparatus and methods of signal to interference and noise ratio (SINR)-based group beam reporting. In particular, this disclosure relates to measurement report configurations for initiating a protocol layer 1 (L1)-SINR based group beam report, and corresponding measurement resource transmissions by a base station, and measurement and reporting actions of the UE to report the L1-SINR for each of at least two beams that can be simultaneously received. The measurement report configurations include a channel measurement resource (CMR) configuration, an interference measurement resource (IMR) configuration, or both.

More specifically, the present disclosure provides apparatus and methods that enable the UE to provide a group beam report that identifies at least two beam pairs, from a plurality of candidate beam pairs, that achieve a SINR property, which can be based on a UE implementation, signaled by the base station, or defined in a technical specification. A suitable SINR property may include, but is not limited to: a first minimum of each SINR for the two beam pairs is maximized among the plurality of beam pairs; a second minimum of each SINR for the two beam pairs is greater than a SINR threshold; a third minimum of each SINR for the two beam pairs configured to reflect cross-beam interference from another beam pair of the two beam pairs; a first maximum of a sum throughput SINR; a second maximum of an average SINR; a third maximum of a fairness metric; or any combination of thereof.

Further, the present disclosure provides a measurement configuration that allows the base station to efficiently transmit a plurality of different combinations of measurement resources on one or more transmit beams to be received on a corresponding one or more receive beams, and for the UE to efficiently calculate and compare SINR values to identify at least two or more beam pairs that meet the SINR property.

For example, in one implementation, the measurement configuration comprises a plurality of CMR repetition sets with a number of repetitions corresponding to a total number of candidate transmit (Tx) beams (or transmission configuration indicator (TCI) states). In this case, in each CMR repetition set, each CMR is transmitted by the same Tx beam, but is measured at the UE by different receive (Rx) beam. This allows the UE to form a complete reference signal received power (RSRP) table between any pair of candidate Tx/Rx beams, which allows the UE to efficiently identify at least two pairs of Tx beams that meet the SINR property.

In another example implementation, the measurement configuration comprises N resource sets of 1 CMR resource plus N−1 IMRs, e.g., 1 CMR mapped to N−1 IMRs, where N is a number of the candidate Tx beams. In this case, in each resource set, the CMR is transmitted by a resource set-specific first Tx beam and the IMRs are transmitted by the remaining (e.g., N−1) Tx beams. Further, for each resource set, the UE receives the 1 CMR and N−1 IMRs with the same Rx beam, which is matched to the resource set-specific first Tx beam transmitting the CMR. Thus, this configuration allows the UE to efficiently compute N−1 SINR values for each resource set and to efficiently identify at least two pairs of Tx beams that meet the SINR property.

In a further example implementation, the measurement configuration comprises N×(N−1) resource sets of a CMR and an IMR, e.g., 1 CMR mapped to 1 IMR. In this case, in each resource set, the CMR is transmitted by a resource set-specific first Tx beam as a measurement signal and the IMR is transmitted by a resource set-specific second Tx beam as interference. Further, for each resource set, the UE receives the CMR and the IMR with a same Rx beam matched to the Tx beam of the CMR. As such, for each resource set, the UE can easily compute the SINR value, and based on the total of N×(N−1) SINR values, the UE can efficiently identify at least two pairs of Tx beams that meet the SINR property.

In other words, in one example, the present solution provides one or more special configuration and/or reporting rules for the CMR and/or IMR to compute the L1-SINR of each of the two beams, since each beam also causes interference to the other beam. Specifically, the present aspect may be utilized in an L1-SINR based group beam report to report the L1-SINR for each of two beams that can be simultaneously received. For instance, such an L1-SINR based group beam report may be setup when a UE is configured with a CSI-ReportConfig with the higher layer parameter reportQuantity set to 'cri-SINR' or 'ssb-Index-SINR.'

Another potential issue with the current group-based beam reporting framework, when the report quantity is set to 'cri-SINR' or 'ssb-Index-SINR,' is that the reported SINR metric of one channel state information reference signal (CSI-RS) resource indicator (CRI) or synchronization signal (SS)/physical broadcast channel (PBCH) resource block indicator (SSBRI) may not correctly reflect the cross-beam interference due to the other CRI or SSBRI, depending on the CMR and IMR configurations of the respective CRI or SSBRI. Consequently, if the base station schedules a multi-transmit/receive point (TRP) and/or multi-panel communication using the reported two different CRIs or SSBRIs, the actual L1-SINR seen at the UE would be different, potentially degrading the performance.

To address this issue, according to the present aspects of L1-SINR based group report, the base station configures multiple candidate beam groups, among which UE reports beam group(s) such that the two beams per group can be received simultaneously. Specifically, the corresponding CMR/IMR per beam in each candidate group is configured such that the reported L1-SINR per beam reflects cross-beam interference from the other beam in the group.

Thus, the present solution improves the efficiency of wireless network communications.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Referring to FIG. 1, an example of a wireless communications system and an access network 100 (also referred to as a wireless wide area network (WWAN)) includes a base station 102 coupled with a user equipment (UE) 104 in a manner that allows for efficient group beam reporting. For example, the base station 102 includes a beam management component 115 configured to transmit a measurement configuration to the UE 104 that identifies a plurality of repetition or resource sets to enable the UE 104 to efficiently perform group beam reporting. The beam management component 115 may be configured to cause transmission of measurement resources on one or more transmit (Tx) beams, for each repetition or resource set, according to the resource configuration. Correspondingly, the UE 104 includes a group beam reporting component 117 configured to receive the measurement configuration, configure one or more receive (Rx) beams to receive the one or more Tx beams for each repetition or resource set, measure corresponding RSRP values, compute SINRs, and select at least two Tx beam pairs that meet the SINR property. Details of the operation of these components is presented in more detail below.

In the wireless communications system and an access network 100, the base stations 102 and UEs 104 may additionally be in communication with an Evolved Packet Core (EPC) 160 and/or another core network 190, such as but not limited to a 5G Core (5GC). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface, which may be wired or wireless). The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102 and/or UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to downlink and uplink (e.g., more or fewer carriers may be allocated for downlink than for uplink). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communication system 100 may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152 and/or the AP 150 may perform a clear channel assessment (CCA) prior to communicating in order to determine whether the channel is available.

A base station 102, whether a small cell 102' or a large cell (e.g., macro base station), may include an evolved Node B (eNB), gNodeB (gNB), or other type of base station. Some base stations, such as gNB 180 may operate in one or more frequency bands within the electromagnetic spectrum.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180 and/or the UE 104 may perform beam training to determine the best receive and transmit directions for each of the base station 180 and/or the UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 to communicate with another UE 104, such as based on sidelink, V2X, V2V, or D2D communication.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet Protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet-switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may provide examples for communication in connection with 5G NR, the concepts described herein may be applicable to other similar areas, such as LTE, LTE-A, CDMA, GSM, and other wireless technologies.

Referring to FIGS. 2A to 2D, the diagrams illustrate examples of different resources that may be used for communications between network elements (e.g., base station 102, UE 104) of the wireless communication system and the access network 100 described above in FIG. 1. The resources may be time-based, frequency-based, or based both on time and frequency.

Figure 2:
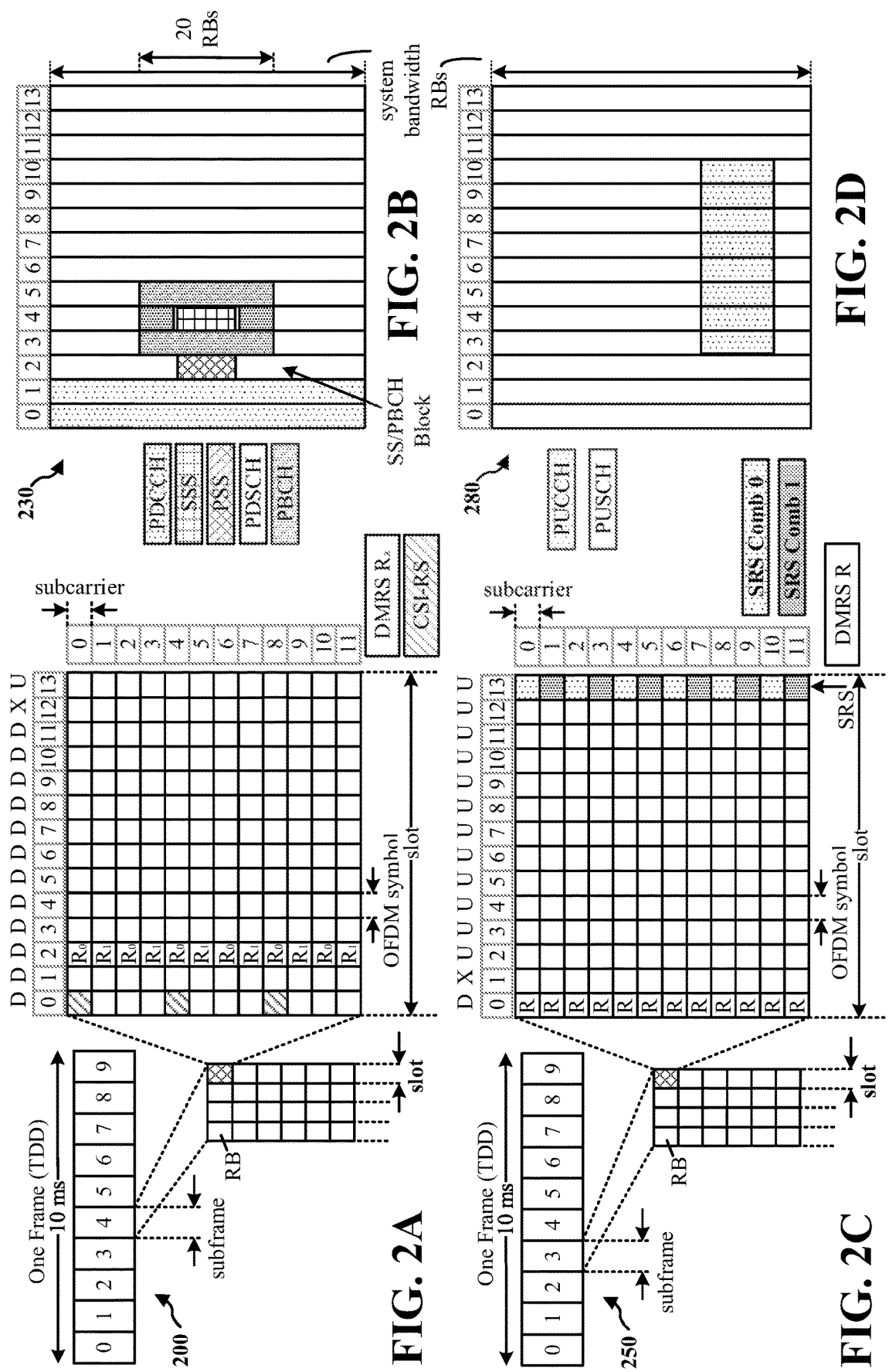
FIG. 2A is a diagram of an example of a first 5G NR frame.
FIG. 2B is a diagram of an example of downlink channels within a 5G NR subframe.
FIG. 2C is a diagram of an example of a second 5G NR frame.
FIG. 2D is a diagram of an example of uplink channels within a 5G NR subframe.

FIG. 2A is a diagram 200 illustrating an example of a first subframe within a 5G NR frame structure. FIG. 2B is a diagram 230 illustrating an example of downlink channels within a 5G NR subframe. FIG. 2C is a diagram 250 illustrating an example of a second subframe within a 5G NR frame structure. FIG. 2D is a diagram 280 illustrating an example of uplink channels within a 5G NR subframe. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 2A, 2C, the 5G NR frame structure is assumed to be TDD, with subframe 4 being configured with slot format 28 (with mostly downlink), where D is downlink, U is uplink, and X is flexible for use between downlink/uplink, and subframe 3 being configured with slot format 34 (with mostly uplink). While subframes 3, 4 are shown with slot formats 34, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through downlink control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (e.g., 10 milliseconds) may be divided into 10 equally sized subframes (e.g., 1 millisecond). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) OFDM (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu *15$ kHz, where p is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. In such an example, the slot duration may be 0.25 milliseconds, the subcarrier spacing may be 60 kHz, and the symbol duration may be approximately 16.67 microseconds ($\mu$s). Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various downlink channels within a subframe of a frame. The physical downlink control channel (PDCCH) carries DCI within one or more control channel elements (CCEs) (e.g., 1, 2, 4, 8, 16, or 32 CCEs), each CCE including nine RE groups (REGs), each REG including four consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The terms SSB and SS/PBCH may be used interchangeably. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 2D illustrates an example of various uplink channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
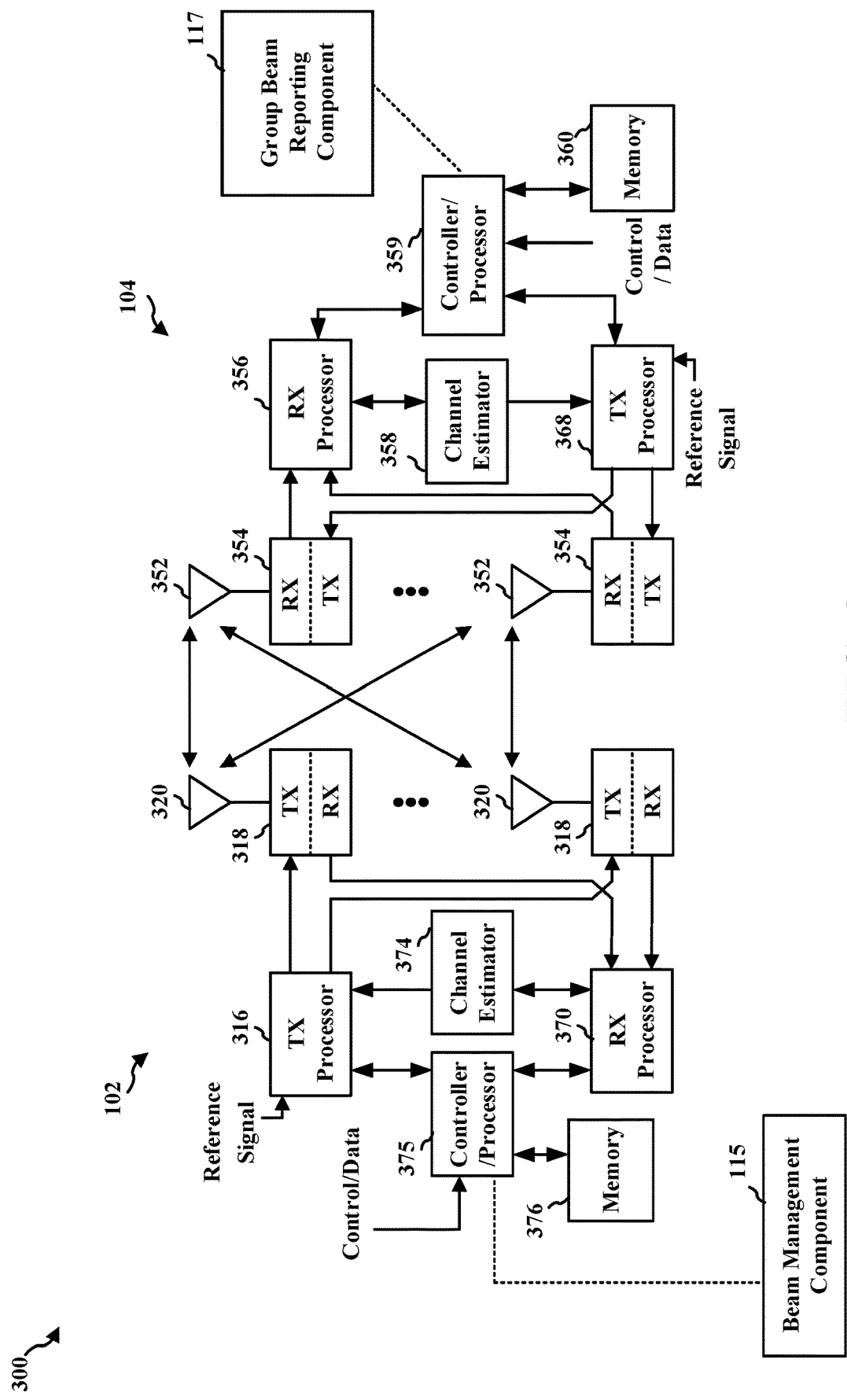
FIG. 3 is a diagram of an example of components of the base station and the user equipment.

FIG. 3 is a block diagram 300 of example hardware components of a base station 102 in communication with a UE 104 in an access network. In the downlink, IP packets from the EPC 160 may be provided to a controller/processor 375. The controller/processor 375 may implement Layer 3 and/or Layer 2 functionality. Layer 3 may include a radio resource control (RRC) layer, and Layer 2 may include a service data adaptation protocol (SDAP) layer, a packet data convergence protocol (PDCP) layer, a radio link control (RLC) layer, and a medium access control (MAC) layer. The controller/processor 375 may provide RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 may implement Layer 1 functionality associated with various signal processing functions. Layer 1, which may include a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 may handle mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM stream may be spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 104. Each spatial stream may then be provided to a different antenna 320 via a separate transmitter 318TX. Each transmitter 318TX may modulate a radio frequency (RF) carrier with a respective spatial stream for transmission.

At the UE 104, each receiver 354RX may be associated with a transmitter 354TX, where the receiver 354RX and the transmitter 354TX together comprise a transceiver 354. Each receiver 354RX may receive a signal through its respective antenna 352. Each receiver 354RX may recover information modulated onto an RF carrier and may provide the information to the receive (RX) processor 356. The TX processor 368 and the RX processor 356 may implement Layer 1 functionality associated with various signal processing functions. The RX processor 356 may perform spatial processing on the information to recover any spatial streams destined for the UE 104. If or when multiple spatial streams are destined for the UE 104, the multiple spatial streams may be combined by the RX processor 356 into a single OFDM symbol stream. The RX processor 356 may then convert the OFDM symbol stream from the time-domain to the frequency domain using a fast Fourier transform (FFT). The frequency domain signal may comprise a separate OFDM symbol stream for each subcarrier of the OFDM signal. The symbols on each subcarrier, and the reference signal, may be recovered and demodulated by determining the most likely signal constellation points transmitted by the base station 102. These soft decisions may be based on channel estimates computed by the channel estimator 358. The soft decisions may then decoded and deinterleaved to recover the data and control signals that were originally transmitted by the base station 102 on the physical channel. The data and control signals may then be provided to the controller/processor 359, which may implement Layer 3, and Layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing to recover IP packets from the EPC 160. The controller/processor 359 is also responsible for error detection using an acknowledge (ACK) and/or negative acknowledge (NACK) protocol to support HARQ operations.

Similar to the functionality described in connection with the downlink transmission by the base station 102, the controller/processor 359 may provide RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The uplink transmission may be processed at the base station 102 in a manner similar to that described in connection with the receiver function at the UE 104. Each receiver 318RX may be associated with a transmitter 318TX, where the receiver 318RX and the transmitter 318TX together comprise a transceiver 318. Each receiver 318RX may receive a signal through its respective antenna 320. Each receiver 318RX may recover information modulated onto an RF carrier and may provide the information to a RX processor 370.

The controller/processor 375 may be associated, and coupled, with a memory 376 that stores program codes and data. The memory 376 may be referred to as a computer-readable medium. The controller/processor 375 may provide demultiplexing between transport and logical channels, packet reassembly, deciphering, header decompression, control signal processing to recover IP packets from the UE 104. IP packets from the controller/processor 375 may be provided to the EPC 160. The controller/processor 375 may also be responsible for error detection using an ACK and/or NACK protocol to support HARQ operations.

At the UE 104, at least one of the TX processor 368, the RX processor 356, and/or the controller/processor 359 may be configured to perform aspects in connection with the group beam reporting component 117 as described herein. For example, the memory 360 may store computer-executable instructions defining the group beam reporting component 117. In other aspects, the TX processor 368, the RX processor 356, and/or the controller/processor 359 may be configured to execute the group beam reporting component 117.

At the base station 102, at least one of the TX processor 316, the RX processor 370, and/or the controller/processor 375 may be configured to perform aspects in connection with the beam management component 115 as described herein. For example, the memory 376 may store computer-executable instructions defining the beam management component 115. In other aspects, the TX processor 316, the RX processor 370, and/or the controller/processor 375 may be configured to execute the beam management component 115.

Figure 4:
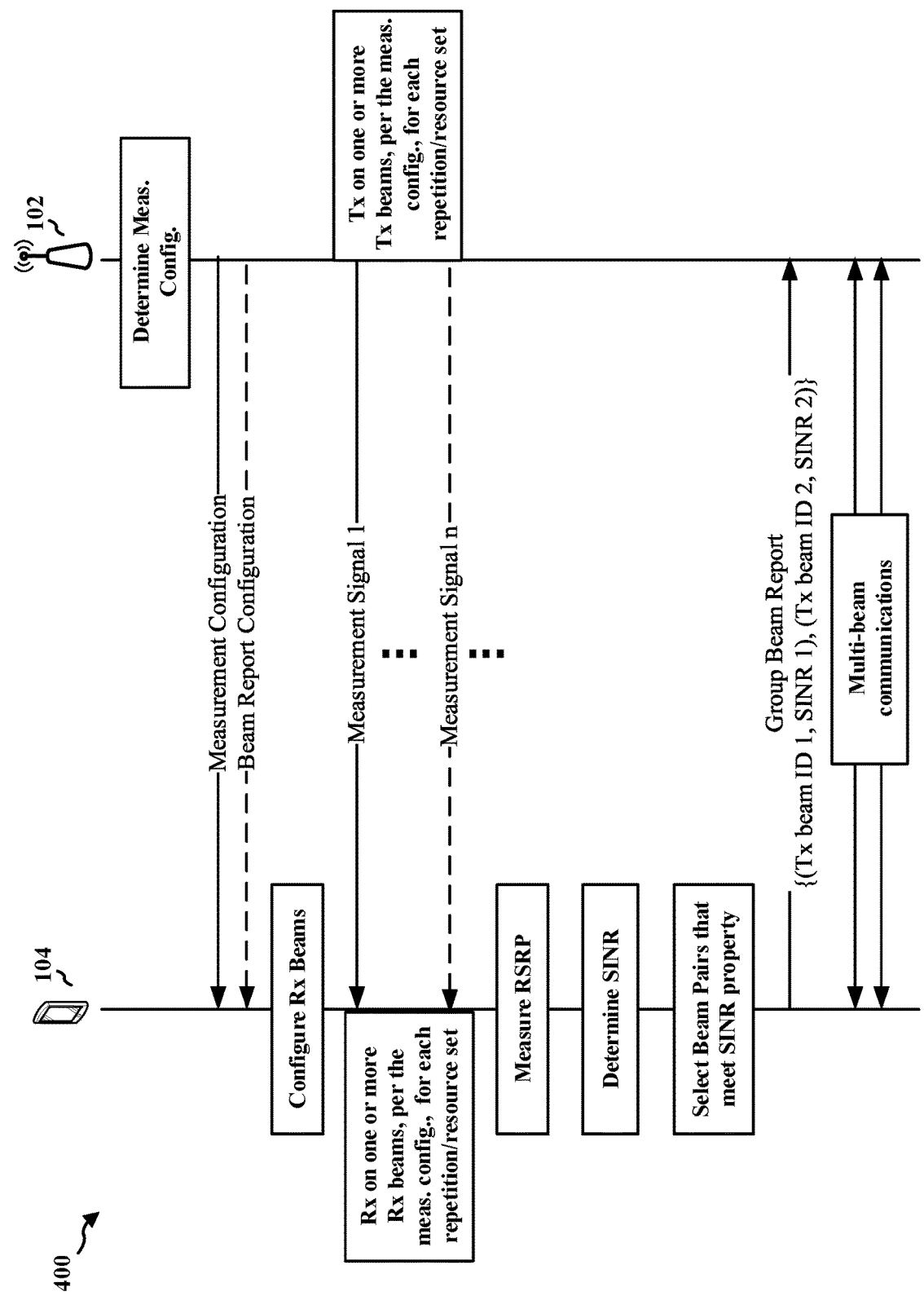
FIG. 4 is a signaling diagram of an example method of SINR based group beam reporting as described herein.

FIG. 4 illustrates an example signaling exchange 400 between the base station 102 and the UE 104 to enable efficient group beam reporting.

The base station 102 determines a measurement configuration for the UE 104 in order to set group beam reporting, such as an L1 SINR group beam report. As briefly discussed above, and as will be described below in more detail, the measurement configuration may indicate: a plurality of CMR repetition sets with a number of repetitions corresponding to a total number (N) of candidate transmit (Tx) beams (or transmission configuration indicator (TCI) states); N resource sets of 1 CMR resource plus N−1 IMRs, e.g., 1 CMR mapped to N−1 IMRs; or N×(N−1) resource sets of a CMR and an IMR, e.g., 1 CMR mapped to 1 IMR.

The base station 102 initiates the exchange 400 by transmitting the measurement configuration to the UE 104, and the UE 104 configures one or more Rx beams to receive the subsequent measurement signals. Additionally or in the alternative, for example, the base station 102 may send a report configuration, such as a CSI-ReportConfig with the higher layer parameter reportQuantity set to 'cri-SINR' or 'ssb-Index-SINR'. If the UE is configured with the higher layer parameter groupBasedBeamReporting set to 'disabled', the UE may report in a single report nrofReportedRSForSINR (higher layer configured) different CRI or SSBRI for each report setting. If the UE is configured with the higher layer parameter groupBasedBeamReporting set to 'enabled', the UE may report in a single reporting instance two or more different CRI or SSBRI for each report setting, where CSI-RS and/or SSB resources can be received simultaneously by the UE. The measurement configuration and the report configuration may be sent in a same message or in different messages. The aspects of the measurement and/or reporting configurations described herein including special configuration and/or reporting rules for the CMR/IMR to compute the L1-SINR of the two beams, since each beam also causes interference to the other beam.

The base station 102 then transmits one or more measurement signals, per each CMR repetition set or per each resource set, based on the measurement configuration.

The UE 104 receives the one or more measurement signals on one or more Rx beams, per each CMR repetition set or per each resource set, based on the measurement configuration.

The UE 104 measures the RSRP of each received signal, determines a SINR, and then selects at least two beam pairs that meet a SINR property. For example, as noted above, the SINR property comprises: a first minimum of each SINR for the two beam pairs is maximized among the plurality of beam pairs; a second a minimum of each SINR for the two beam pairs is greater than a SINR threshold; a third minimum of each SINR for the two beam pairs configured to reflect cross-beam interference from another beam pair of the two beam pairs; a first maximum of a sum throughput SINR; a second maximum of an average SINR; a third maximum of a fairness metric; or any combination of thereof.

The UE 104 then transmits a group beam report that includes the Tx beam identifier (ID) and corresponding SINR value for each of at least two pairs of Tx beams that meet the SINR property.

Subsequently, the base station 102 can establish multi-beam communications with the UE 104 based on the information in the group beam report.

Referring to FIG. 5, an example RSRP table 500 may be utilized by the UE 104 for tracking measured values and selecting the beam pairs in an example of the signaling exchange 400 in a case where the base station 102 has a total of 6 candidate Tx beams 502 matching 6 candidate Rx beams 504 at UE 104. For instance, Rx beam 1 matches Tx beam 1 and is indicated by TCI state 1, Rx beam 2 matches Tx beam 2 and is indicated by TCI state 2, and so on.

According to the signaling exchange 400, one goal is for the UE 104 to select two beam pairs (Tx beam A, Rx beam A) and (Tx beam B, Rx beam B), such that both beam pairs have good SINR values when simultaneously received by the UE 104. In other words, the "good" SINR values of the beam pairs means that the beam pairs achieve the SINR property, e.g., a minimum of the two SINRs is maximized among all possible combinations.

For example, if beam pair A and B are selected, wherein A and B have a value from 1 to 6 (corresponding to the number of candidates) in this example, then:

SINR for beam A is defined as RSRP A-A/((RSRP B-A)+ background interference & noise); and SINR for beam B is defined as RSRP B-B/((RSRP A-B)+ background interference & noise).

Thus, the UE 104 may fill the RSRP table 500 with a plurality of RSRP values 506 corresponding to each beam pair. The UE 104 may then utilize the plurality of RSRP values to determine the corresponding SINR values, and hence select two or more beam pairs that meet the SINR property.

Referring to FIG. 6, an example RSRP table 600 represents an implementation where the measurement configuration indicates a plurality of CMR repetition sets 602 with a number of repetitions corresponding to a total number (N) of candidate transmit (Tx) beams (or transmission configuration (TCI) states), e.g., 6 in this example.

In this option, more specifically, for each Tx beam (or TCI state), the base station 102 configures CMR with repetition with a repetition number equal to a total number of candidate Tx beams (or TCI states). In each CMR repetition set, each CMR is transmitted by the same Tx beam, but is measured at the UE 104 by a different Rx beam. By measuring different CMR repetition sets, the UE 104 forms the complete RSRP table 600 between any pair of Tx/Rx beams.

Then, the UE 104 identifies the two or more Tx beams that achieve the SINR property, such as but not limited to where a minimum of the two SINRs is maximized.

The UE 104 reports the two Tx beam IDs that can be simultaneously received and the corresponding SINRs to the base station 102. The Tx beam ID can also be represented by a corresponding CMR ID, a CMR repetition set ID, or a TCI state ID.

Referring to FIG. 7, an example RSRP table 700 represents an implementation where the measurement configuration indicates N resource sets 702 of 1 CMR resource plus N−1 IMRs, e.g., 1 CMR mapped to N−1 IMRs, wherein N is the number of candidate Tx beams.

In this option, in each resource set 702 of 1 CMR+N−1 IMRs, the base station 102 transmits the CMR via one Tx beam as signal, and transmits the other N−1 IMRs by the other N−1 Tx beams as interference.

The UE 104 can associate each IMR with a respective Tx beam either based on an IMR ordering or a Tx beam ID associated to each IMR.

The UE 104 receives the 1 CMR+N−1 IMRs with the same Rx beam matched to the Tx beam as signal (or its TCI state). Then, the UE 104 can compute N−1 L1-SINR values for each resource set. Thus, based on a total of N×(N−1) SINR values from the N sets, the UE 104 identifies at least two Tx beams that meet the SINR property, such as but not limited to a minimum of the two SINRs being maximized.

The UE 104 reports the two Tx beam IDs that can be simultaneously received and corresponding SINRs to base station 102. In this case, the Tx beam ID can also be represented by a corresponding CMR ID, a 1 CMR+N−1 IMR set ID (e.g., resource set ID), or a TCI state ID.

Figure 8:
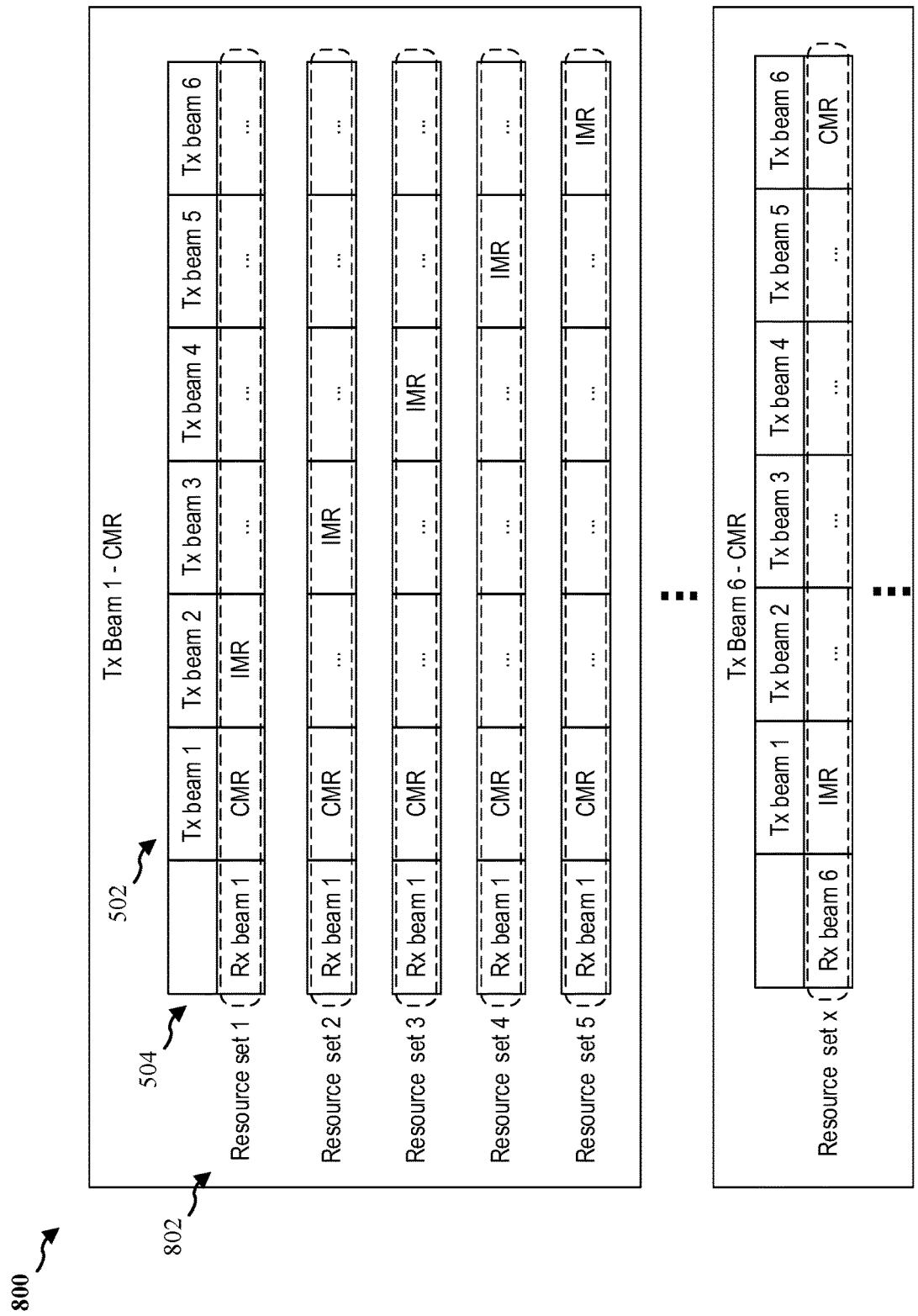
FIG. 8 is a block diagram of a format of a third option measurement configuration according to aspects described herein.

Referring to FIG. 8, an example measurement configuration format 800 represents an implementation where the measurement configuration indicates N×(N−1) resource sets of a CMR and an IMR, e.g., 1 CMR mapped to 1 IMR, where N is the number of candidate Tx beams. The measurement configuration format 800 is based on a scenario where N=6.

In this option, in each resource set 802 of 1 CMR+1 IMR, the base station 102 transmits the CMR by a Tx beam as signal, and the base station 102 transmits the IMR by another Tx beam as interference. The UE 104 can associate the IMR with a respective Tx beam either based on the IMR ordering or a Tx beam ID associated with each IMR.

Further, in this option, the UE 104 receives each 1 CMR+1 IMR resource set 802 with the same Rx beam matched to the Tx beam as signal (or its TCI state). Therefore, the UE 104 can compute 1 L1-SINR value per resource set 802.

For simplicity, FIG. 8 includes a full example of the N−1 resource sets 802 for transmitting the CMR on Tx beam 1 and transmitting the IMR on each of the other 5 Tx beams for receipt on Rx beam 1. A similar scheme would be used for each Tx beam up to Tx beam 6 for transmitting the CMR.

Based on a total of N×(N−1) SINR values from the N×(N−1) resource sets 802, the UE 104 identifies the at least two Tx beams that achieve the SINR property, such as but not limited to where a minimum of the two SINRs is maximized.

Then, the UE 104 reports the at least two Tx beam IDs that can be simultaneously received and corresponding SINRs to the base station 102. In this case, the Tx beam ID can also be represented by a corresponding CMR ID, a 1 CMR+1 IMR set ID (e.g., a resource set ID), or TCI state ID.

Additionally, in this option, if two CMR IDs are reported, then each CMR must be the IMR of the other CMR. For instance, IMR 1 must be from the same Tx beam transmitting CMR 2, and IMR 2 must be from same Tx beam transmitting CMR 1.

For all of the options described in FIGS. 6-8, the UE 104 may additionally ensure the two reported Tx beam IDs can be simultaneously transmitted by base station 102. For instance, the base station 102 can provide the UE 104 with information about which Tx beams are compatible with one another, e.g., based on transmission-reception point (TRP)/panel indexes, CORESETPoolIndexes, or simultaneously transmittable beam group indexes. Thus, in this case, when selecting the at least two beam pairs, the UE 104 may additional check to confirm that the at least two reported Tx beams have different TRP/panel indexes, CORESETPoolIndexes, or simultaneously transmittable beam group indexes.

Figure 9:
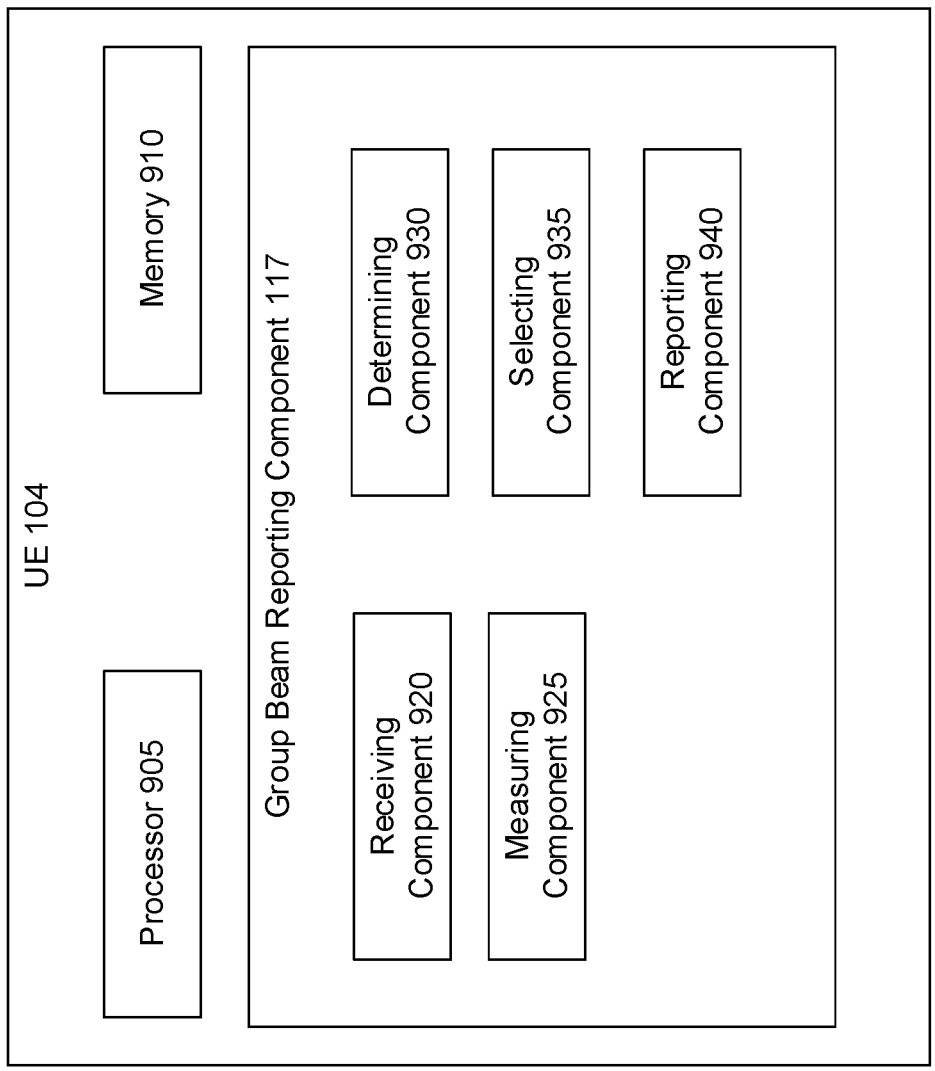
FIG. 9 is a block diagram of a UE including components for performing the actions relating to SINR based group beam reporting as described herein.
Figure 10:
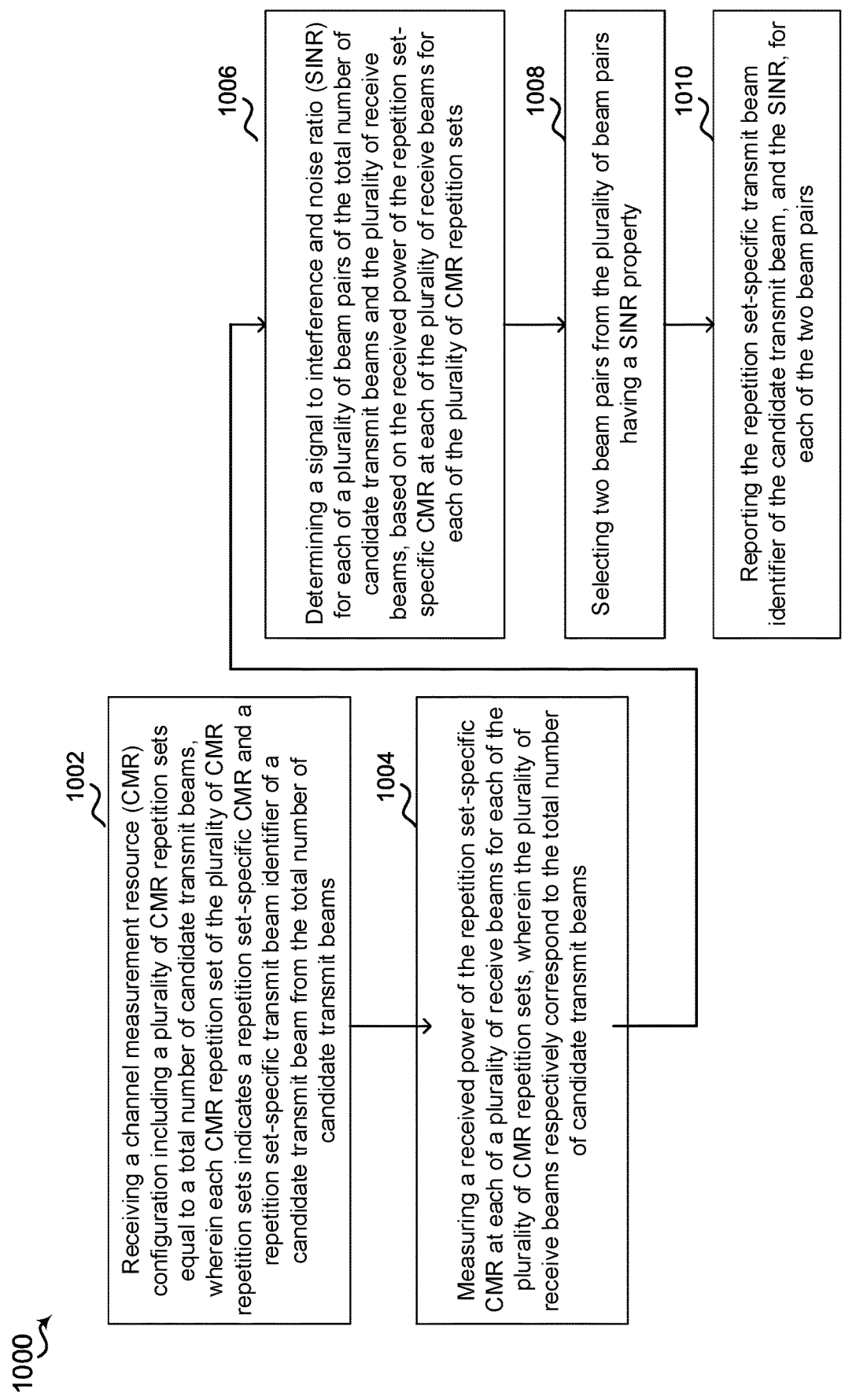
FIGS. 10-12 are flowcharts of methods of wireless communication for performing the actions relating to SINR based group beam reporting respectively based on a first, second, and third option measurement configuration as described herein.

Referring to FIGS. 9 and 10, in operation, the UE 104 may perform a method 1000 of wireless communication where the measurement configuration indicates a plurality of CMR repetition sets 602 (see FIG. 6) with a number of repetitions corresponding to a total number (N) of candidate transmit (Tx) beams (or transmission configuration indicator (TCI) states). For example, the UE 104 may perform method 1000 via execution of group beam reporting component 117 by processor 905 and/or memory 910, which may include the TX processor 368, the RX processor 356, and/or the controller/processor 359 of FIG. 3.

At block 1002, the method 1000 includes receiving a channel measurement resource (CMR) configuration including a plurality of CMR repetition sets equal to a total number of candidate transmit beams, wherein each CMR repetition set of the plurality of CMR repetition sets indicates a repetition set-specific CMR and a repetition set-specific transmit beam identifier of a candidate transmit beam from the total number of candidate transmit beams. For example, in an aspect, UE 104, processor 905, memory 910, group beam reporting component 117, and/or receiving component 920 may be configured to or may comprise means for receiving a channel measurement resource (CMR) configuration including a plurality of CMR repetition sets equal to a total number of candidate transmit beams, wherein each CMR repetition set of the plurality of CMR repetition sets indicates a repetition set-specific CMR and a repetition set-specific transmit beam identifier of a candidate transmit beam from the total number of candidate transmit beams.

For example, the receiving at block 1002 may include receiving, via the transceiver 354 and/or receiver 354RX, a wireless signal that includes the measurement configuration, where the UE 104 decodes the wireless signal as described above in FIG. 3. Further, for example, the measurement configuration may be the configuration as described above with respect to FIG. 6.

Further, for example, the receiving at block 1002 of the measurement configuration may be performed when the UE 104 or the base station 102 are initiating communications on multiple Tx/Rx beams.

In an optional aspect, the receiving at block 1002 further comprises receiving a channel state information report configuration message having a report quantity set to a SINR value. For instance, a current technical specification supports using a CSI-ReportConfig measurement configuration message having a cri-SINR and SSB-index-SINR as two possible reportQuantity values for this context, as discussed above.

At block 1004, the method 1000 includes measuring a received power of the repetition set-specific CMR at each of a plurality of receive beams for each of the plurality of CMR repetition sets, wherein the plurality of receive beams respectively correspond to the total number of candidate transmit beams. For example, in an aspect, UE 104, processor 905, memory 910, group beam reporting component 117, and/or measuring component 925 may be configured to or may comprise means for measuring a received power of the repetition set-specific CMR at each of a plurality of receive beams for each of the plurality of CMR repetition sets, wherein the plurality of receive beams respectively correspond to the total number of candidate transmit beams.

For example, the measuring at block 1004 may include the UE 104 calculating the RSRP values of the received signals and recording the values in an RSRP table, such as is described above with respect to FIGS. 5 and 6.

At block 1006, the method 1000 includes determining a signal to interference and noise ratio (SINR) for each of a plurality of beam pairs of the total number of candidate transmit beams and the plurality of receive beams, based on the received power of the repetition set-specific CMR at each of the plurality of receive beams for each of the plurality of CMR repetition sets. For example, in an aspect, UE 104, processor 905, memory 910, group beam reporting component 117, and/or determining component 930 may be configured to or may comprise means for determining a signal to interference and noise ratio (SINR) for each of a plurality of beam pairs of the total number of candidate transmit beams and the plurality of receive beams, based on the received power of the repetition set-specific CMR at each of the plurality of receive beams for each of the plurality of CMR repetition sets.

For example, the determining at block 1006 may include the UE 104 determining the SINR values for each of the beam pairs provided by the measurement configuration, such as described above with respect to FIGS. 5 and 6.

At block 1008, the method 1000 includes selecting two beam pairs from the plurality of beam pairs having a SINR property. For example, in an aspect, UE 104, processor 905, memory 910, group beam reporting component 117, and/or selecting component 935 may be configured to or may comprise means for selecting two beam pairs from the plurality of beam pairs having a SINR property.

For example, the selecting at block 1008 may include selecting at least two beam pairs that meet one or more SINR properties such as, but not limited to: a first minimum of each SINR for the two beam pairs is maximized among the plurality of beam pairs; a second minimum of each SINR for the two beam pairs is greater than a SINR threshold; a third minimum of each SINR for the two beam pairs configured to reflect cross-beam interference from another beam pair of the two beam pairs; a first maximum of a sum throughput SINR; a second maximum of an average SINR; a third maximum of a fairness metric; or any combination of thereof. The SINR property can be based on a UE implementation, signaled by the base station, or defined in a technical specification.

Further, for example, the selecting at block 1008 may be performed so that compatible simultaneously transmittable beam pairs having sufficient throughput are identified.

In an optional aspect, during the selecting at block 1008, the UE 104 may additionally ensure the two or more selected Tx beam pairs can be simultaneously transmitted by base station 102. For instance, the base station 102 can provide the UE 104 with information about which Tx beams are compatible with one another, e.g., based on TRP/panel indexes, CORESETPoolIndexes, or simultaneously transmittable beam group indexes.

At block 1010, the method 1000 includes reporting the repetition set-specific transmit beam identifier of the candidate transmit beam, and the SINR, for each of the two beam pairs. For example, in an aspect, UE 104, processor 905, memory 910, group beam reporting component 117, and/or reporting component 940 may be configured to or may comprise means for reporting the repetition set-specific transmit beam identifier of the candidate transmit beam, and the SINR, for each of the two beam pairs.

For example, the reporting at block 1010 may include reporting each repetition set-specific transmit beam identifier as a CMR identifier, a CMR repetition set identifier, or a transmission configuration indicator state identifier.

Further, for example, the reporting at block 1010 may be performed by transmitting, via the transceiver 354 and/or the transmitter 354TX, a wireless signal to the base station 102, wherein the wireless signal includes a L1 SINR group beam report.

Optionally, the method 1000 may further include communicating with the base station 102 on two or more beam pairs corresponding to the reported repetition set-specific transmit beam identifiers.

In a further optional aspect, the method 1000 may include reporting more than two beam pairs. For instance, the method 1000 may be modified such that selecting two beam pairs from the plurality of beam pairs having the SINR property includes selecting more than two beam pairs from the plurality of beam pairs having the SINR property, and such that reporting the repetition set-specific transmit beam identifier of the candidate transmit beam, and the SINR, for each of the two beam pairs includes reporting the repetition set-specific transmit beam identifier of the candidate transmit beam, and the SINR, for each of the more than two beam pairs.

Figure 11:
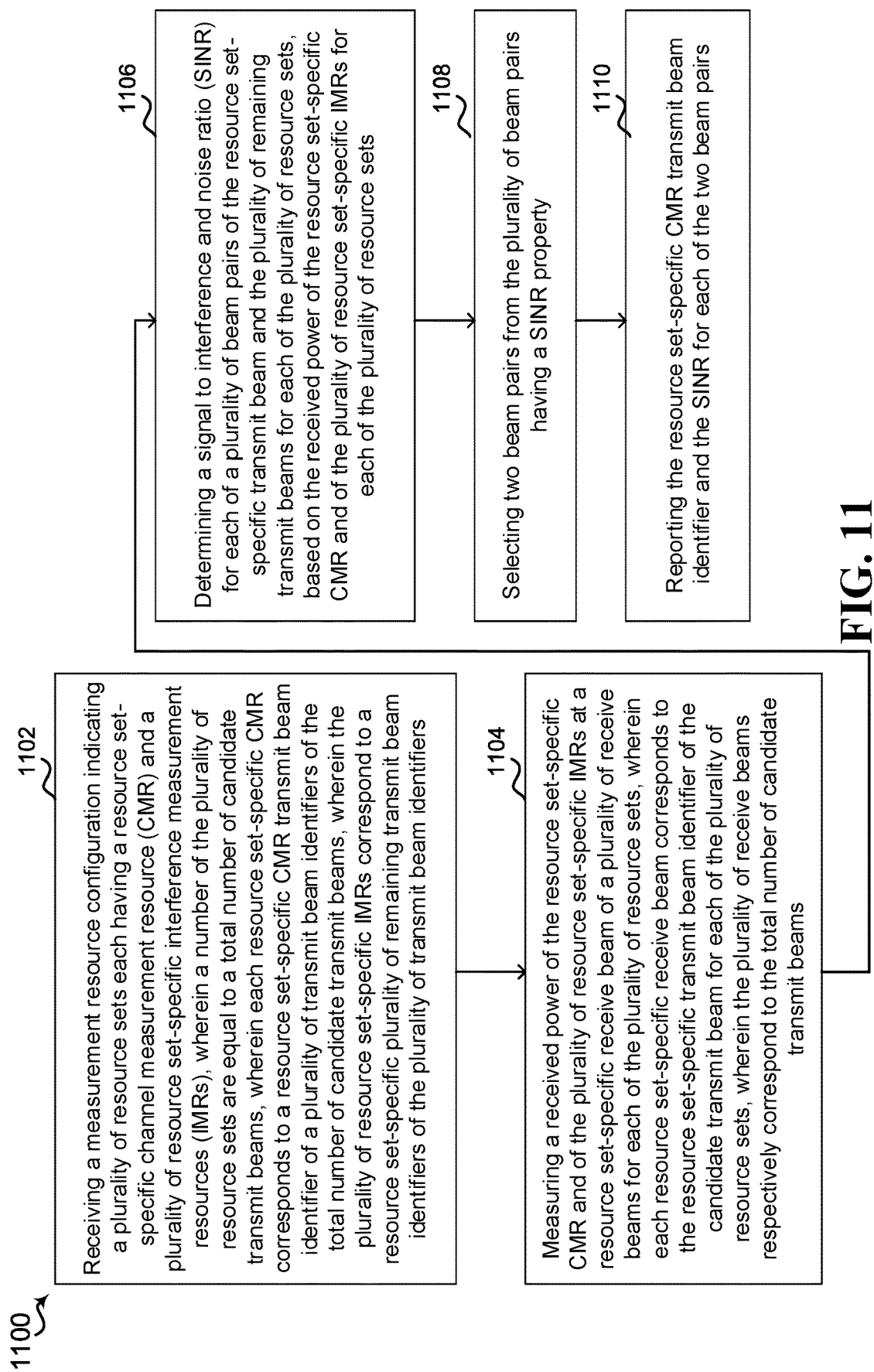

Referring to FIGS. 9 and 11, in operation, UE 104 may perform a method 1100 of wireless communication where the measurement configuration indicates N resource sets 702 (see FIG. 7) of 1 CMR resource plus N−1 IMRs, e.g., 1 CMR mapped to N−1 IMRs, wherein N is the number of candidate Tx beams. The UE 104 may perform the method 1100 via execution of group beam reporting component 117 by processor 905 and/or memory 910, which may include the TX processor 368, the RX processor 356, and/or the controller/processor 359 of FIG. 3.

At block 1102, the method 1100 includes receiving a measurement resource configuration indicating a plurality of resource sets each having a resource set-specific channel measurement resource (CMR) and a plurality of resource set-specific interference measurement resources (IMRs), wherein a number of the plurality of resource sets are equal to a total number of candidate transmit beams, wherein each resource set-specific CMR corresponds to a resource set-specific CMR transmit beam identifier of a plurality of transmit beam identifiers of the total number of candidate transmit beams, wherein the plurality of resource set-specific IMRs correspond to a resource set-specific plurality of remaining transmit beam identifiers of the plurality of transmit beam identifiers. For example, in an aspect, UE 104, processor 905, memory 910, group beam reporting component 117, and/or receiving component 920 may be configured to or may comprise means for receiving a measurement resource configuration indicating a plurality of resource sets each having a resource set-specific channel measurement resource (CMR) and a plurality of resource set-specific interference measurement resources (IMRs), wherein a number of the plurality of resource sets are equal to a total number of candidate transmit beams, wherein each resource set-specific CMR corresponds to a resource set-specific CMR transmit beam identifier of a plurality of transmit beam identifiers of the total number of candidate transmit beams, wherein the plurality of resource set-specific IMRs correspond to a resource set-specific plurality of remaining transmit beam identifiers of the plurality of transmit beam identifiers.

For example, each resource set-specific CMR transmit beam identifier can include a CMR identifier, a resource set identifier, or a transmission configuration indicator state identifier.

For example, the receiving at block 1102 may include receiving, via the transceiver 354 and/or the receiver 354RX, a wireless signal that includes the measurement configuration, where the UE 104 decodes the wireless signal as described above in FIG. 3. Further, for example, the measurement configuration may be the configuration as described above with respect to FIG. 7.

Further, for example, the receiving at block 1102 of the measurement configuration may be performed when the UE 104 or the base station 102 are initiating communications on multiple Tx/Rx beams.

In an optional aspect, the receiving at block 1102 further comprises receiving a channel state information report configuration message having a report quantity set to a SINR value. For instance, a current technical specification supports using a CSI-ReportConfig measurement configuration message having a cri-SINR and SSB-index-SINR as two possible reportQuantity values for this context, as discussed above.

In an optional aspect, the method 1100 may further include determining, for each of the plurality of resource sets, a remaining transmit beam identifier of the resource set-specific plurality of remaining transmit beam identifiers for each of the plurality of resource set-specific IMRs based on an IMR ordering or based the resource set-specific CMR transmit beam identifier associated with the IMR.

At block 1104, the method 1100 includes measuring a received power of the resource set-specific CMR and of the plurality of resource set-specific IMRs at a resource set-specific receive beam of a plurality of receive beams for each of the plurality of resource sets, wherein each resource set-specific receive beam corresponds to the resource set-specific transmit beam identifier of the candidate transmit beam for each of the plurality of resource sets, wherein the plurality of receive beams respectively correspond to the total number of candidate transmit beams. For example, in an aspect, UE 104, processor 905, memory 910, group beam reporting component 117, and/or measuring component 925 may be configured to or may comprise means for measuring a received power of the resource set-specific CMR and of the plurality of resource set-specific IMRs at a resource set-specific receive beam of a plurality of receive beams for each of the plurality of resource sets, wherein each resource set-specific receive beam corresponds to the resource set-specific transmit beam identifier of the candidate transmit beam for each of the plurality of resource sets, wherein the plurality of receive beams respectively correspond to the total number of candidate transmit beams.

For example, the measuring at block 1104 may include the UE 104 calculating the RSRP values of the received signals and recording the values in an RSRP table, such as is described above with respect to FIGS. 5 and 7.

At block 1106, the method 1100 includes determining a signal to interference and noise ratio (SINR) for each of a plurality of beam pairs of the resource set-specific transmit beam and the plurality of remaining transmit beams for each of the plurality of resource sets, based on the received power of the resource set-specific CMR and of the plurality of resource set-specific IMRs for each of the plurality of resource sets. For example, in an aspect, UE 104, processor 905, memory 910, group beam reporting component 117, and/or determining component 930 may be configured to or may comprise means for determining a signal to interference and noise ratio (SINR) for each of a plurality of beam pairs of the resource set-specific transmit beam and the plurality of remaining transmit beams for each of the plurality of resource sets, based on the received power of the resource set-specific CMR and of the plurality of resource set-specific IMRs for each of the plurality of resource sets.

For example, the determining at block 1106 may include the UE 104 determining the SINR values for each of the beam pairs provided by the measurement configuration, such as described above with respect to FIGS. 5 and 7.

At block 1108, the method 1100 includes selecting two beam pairs from the plurality of beam pairs having a SINR property. For example, in an aspect, UE 104, processor 905, memory 910, group beam reporting component 117, and/or selecting component 935 may be configured to or may comprise means for selecting two beam pairs from the plurality of beam pairs having a SINR property.

For example, the selecting at block 1108 may include selecting at least two beam pairs that meet one or more SINR properties such as, but not limited to: a first minimum of each SINR for the two beam pairs is maximized among the plurality of beam pairs; a second minimum of each SINR for the two beam pairs is greater than a SINR threshold; a third minimum of each SINR for the two beam pairs configured to reflect cross-beam interference from another beam pair of the two beam pairs; a first maximum of a sum throughput SINR; a second maximum of an average SINR; a third maximum of a fairness metric; or any combination of thereof. The SINR property can be based on a UE implementation, signaled by the base station, or defined in a technical specification.

Further, for example, the selecting at block 1108 may be performed so that compatible simultaneously transmittable beam pairs having sufficient throughput are identified.

In an optional aspect, during the selecting at block 1108, the UE 104 may additionally ensure the two or more selected Tx beam pairs can be simultaneously transmitted by base station 102. For instance, the base station 102 can provide the UE 104 with information about which Tx beams are compatible with one another, e.g., based on TRP/panel indexes, CORESETPoolIndexes, or simultaneously transmittable beam group indexes.

At block 1110, the method 1100 includes reporting the resource set-specific CMR transmit beam identifier and the SINR for each of the two beam pairs. For example, in an aspect, UE 104, processor 905, memory 910, group beam reporting component 117, and/or reporting component 940 may be configured to or may comprise means for reporting the resource set-specific CMR transmit beam identifier and the SINR for each of the two beam pairs.

For example, the reporting at block 1110 may include reporting each repetition set-specific transmit beam identifier as a CMR identifier, a resource set identifier, or a transmission configuration indicator state identifier.

Further, for example, the reporting at block 1110 may be performed by transmitting, via the transceiver 354 and/or the transmitter 354TX, a wireless signal to the base station 102, wherein the wireless signal includes a L1 SINR group beam report.

Optionally, the method 1100 may further include communicating with the base station 102 on two or more beam pairs corresponding to the reported repetition set-specific transmit beam identifiers.

In a further optional aspect, the method 1100 may include reporting more than two beam pairs. For instance, the method 1100 may be modified such that selecting two beam pairs from the plurality of beam pairs having the SINR property includes selecting more than two beam pairs from the plurality of beam pairs having the SINR property, and such that reporting the repetition set-specific transmit beam identifier of the candidate transmit beam, and the SINR, for each of the two beam pairs includes reporting the repetition set-specific transmit beam identifier of the candidate transmit beam, and the SINR, for each of the more than two beam pairs.

Figure 12:
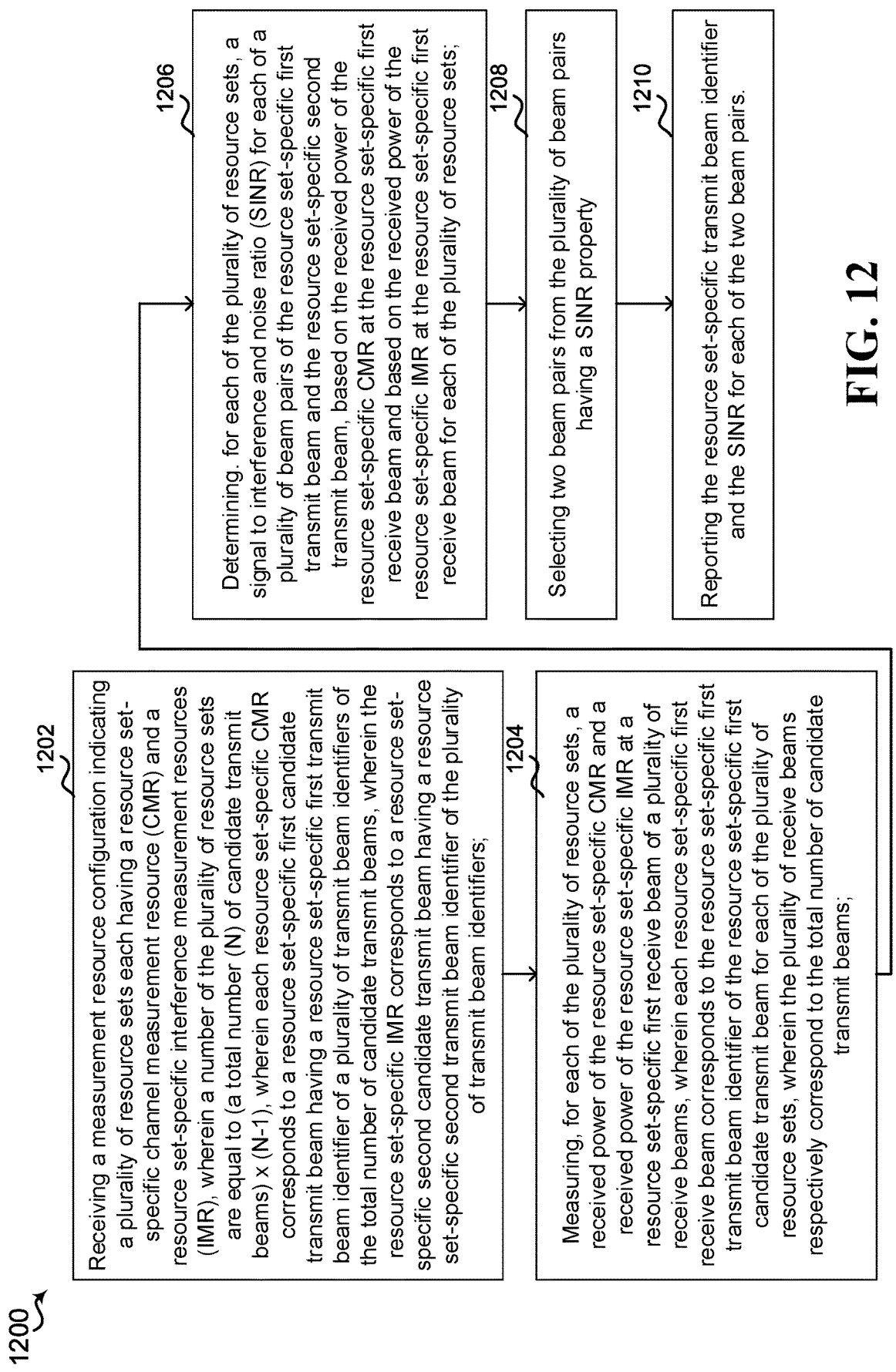

Referring to FIGS. 9 and 12, in operation, the UE 104 may perform a method 1200 of wireless communication where the measurement configuration 800 indicates N×(N−1) resource sets of a CMR and an IMR, e.g., 1 CMR mapped to 1 IMR, where N is the number of candidate Tx beams. The UE 104 may perform the method 1200 via execution of group beam reporting component 117 by processor 905 and/or memory 910, which may include the TX processor 368, the RX processor 356, and/or the controller/processor 359 of FIG. 3.

At block 1202, the method 1200 includes receiving a measurement resource configuration indicating a plurality of resource sets each having a resource set-specific channel measurement resource (CMR) and a resource set-specific interference measurement resources (IMR), wherein a number of the plurality of resource sets are equal to (a total number (N) of candidate transmit beams)×(N−1), wherein each resource set-specific CMR corresponds to a resource set-specific first candidate transmit beam having a resource set-specific first transmit beam identifier of a plurality of transmit beam identifiers of the total number of candidate transmit beams, wherein the resource set-specific IMR corresponds to a resource set-specific second candidate transmit beam having a resource set-specific second transmit beam identifier of the plurality of transmit beam identifiers. For example, in an aspect, UE 104, processor 905, memory 910, group beam reporting component 117, and/or receiving component 920 may be configured to or may comprise means for receiving a measurement resource configuration indicating a plurality of resource sets each having a resource set-specific channel measurement resource (CMR) and a resource set-specific interference measurement resources (IMR), wherein a number of the plurality of resource sets are equal to (a total number (N) of candidate transmit beams)×(N−1), wherein each resource set-specific CMR corresponds to a resource set-specific first candidate transmit beam having a resource set-specific first transmit beam identifier of a plurality of transmit beam identifiers of the total number of candidate transmit beams, wherein the resource set-specific IMR corresponds to a resource set-specific second candidate transmit beam having a resource set-specific second transmit beam identifier of the plurality of transmit beam identifiers.

For example, each resource set-specific CMR transmit beam identifier can include a CMR identifier, a resource set identifier, or a transmission configuration indicator state identifier.

For example, the receiving at block 1202 may include receiving, via the transceiver 354 and/or the receiver 354RX, a wireless signal that includes the measurement configuration, where the UE 104 decodes the wireless signal as described above in FIG. 3. Further, for example, the measurement configuration may be the configuration as described above with respect to FIG. 8.

Further, for example, the receiving at block 1202 of the measurement configuration may be performed when the UE 104 or the base station 102 are initiating communications on multiple Tx/Rx beams.

In an optional aspect, the receiving at block 1202 of the measurement configuration further comprises receiving a channel state information report configuration message having a report quantity set to a SINR value. For instance, a current technical specification supports using a CSI-Report-Config measurement configuration message having a cri-SINR and SSB-index-SINR as two possible reportQuantity values for this context, as discussed above.

In an optional aspect, the method 1100 may further include determining, for each of the plurality of resource sets, the resource set-specific second transmit beam identifier for each resource set-specific IMR based on an IMR ordering or based the resource set-specific first transmit beam identifier of the resource set-specific CMR associated with the resource set-specific IMR.

At block 1204, the method 1200 includes measuring, for each of the plurality of resource sets, a received power of the resource set-specific CMR and a received power of the resource set-specific IMR at a resource set-specific first receive beam of a plurality of receive beams, wherein each resource set-specific first receive beam corresponds to the resource set-specific first transmit beam identifier of the resource set-specific first candidate transmit beam for each of the plurality of resource sets, wherein the plurality of receive beams respectively correspond to the total number of candidate transmit beams. For example, in an aspect, UE 104, processor 905, memory 910, group beam reporting component 117, and/or measuring component 925 may be configured to or may comprise means for measuring, for each of the plurality of resource sets, a received power of the resource set-specific CMR and a received power of the resource set-specific IMR at a resource set-specific first receive beam of a plurality of receive beams, wherein each resource set-specific first receive beam corresponds to the resource set-specific first transmit beam identifier of the resource set-specific first candidate transmit beam for each of the plurality of resource sets, wherein the plurality of receive beams respectively correspond to the total number of candidate transmit beams.

For example, the measuring at block 1104 may include the UE 104 calculating the RSRP values of the received signals and recording the values in an RSRP table, such as is described above with respect to FIGS. 5 and 7.

At block 1206, the method 1200 includes determining for each of the plurality of resource sets, a signal to interference and noise ratio (SINR) for each of a plurality of beam pairs of the resource set-specific first transmit beam and the resource set-specific second transmit beam, based on the received power of the resource set-specific CMR at the resource set-specific first receive beam and based on the received power of the resource set-specific IMR at the resource set-specific first receive beam for each of the plurality of resource sets. For example, in an aspect, UE 104, processor 905, memory 910, group beam reporting component 117, and/or determining component 930 may be configured to or may comprise means for determining for each of the plurality of resource sets, a signal to interference and noise ratio (SINR) for each of a plurality of beam pairs of the resource set-specific first transmit beam and the resource set-specific second transmit beam, based on the received power of the resource set-specific CMR at the resource set-specific first receive beam and based on the received power of the resource set-specific IMR at the resource set-specific first receive beam for each of the plurality of resource sets.

For example, the determining at block 1206 may include the UE 104 determining the SINR values for each of the beam pairs provided by the measurement configuration, such as described above with respect to FIGS. 5 and 8.

At block 1208, the method 1200 includes selecting two beam pairs from the plurality of beam pairs having a SINR property. For example, in an aspect, UE 104, processor 905, memory 910, group beam reporting component 117, and/or selecting component 935 may be configured to or may comprise means for selecting two beam pairs from the plurality of beam pairs having a SINR property.

For example, the selecting at block 1208 may include selecting at least two beam pairs that meet one or more SINR properties such as, but not limited to: first a minimum of each SINR for the two beam pairs is maximized among the plurality of beam pairs; a second minimum of each SINR for the two beam pairs is greater than a SINR threshold; a third minimum of each SINR for the two beam pairs configured to reflect cross-beam interference from another beam pair of the two beam pairs; a first maximum of a sum throughput SINR; a second maximum of an average SINR; a third maximum of a fairness metric; or any combination of thereof. The SINR property can be based on a UE implementation, signaled by the base station, or defined in a technical specification.

Further, for example, the selecting at block 1208 may be performed so that compatible simultaneously transmittable beam pairs having sufficient throughput are identified.

In an optional aspect, during the selecting at block 1208, the UE 104 may additionally ensure the two or more selected Tx beam pairs can be simultaneously transmitted by base station 102. For instance, the base station 102 can provide the UE 104 with information about which Tx beams are compatible with one another, e.g., based on TRP/panel indexes, CORESETPoolIndexes, or simultaneously transmittable beam group indexes.

At block 1210, the method 1200 includes reporting the resource set-specific transmit beam identifier and the SINR for each of the two beam pairs. For example, in an aspect, UE 104, processor 905, memory 910, group beam reporting component 117, and/or reporting component 940 may be configured to or may comprise means for reporting the resource set-specific transmit beam identifier and the SINR for each of the two beam pairs.

For example, the reporting at block 1210 may include reporting each repetition set-specific transmit beam identifier as a CMR identifier, a resource set identifier, or a transmission configuration indicator state identifier.

Further, for example, the reporting at block 1210 may be performed by transmitting, via the transceiver 354 and/or the transmitter 354TX, a wireless signal to the base station 102, wherein the wireless signal includes a L1 SINR group beam report.

Optionally, the method 1200 may further include communicating with the base station 102 on two or more beam pairs corresponding to the reported repetition set-specific transmit beam identifiers.

In a further optional aspect, the method 1200 may include reporting more than two beam pairs. For instance, the method 1200 may be modified such that selecting two beam pairs from the plurality of beam pairs having the SINR property includes selecting more than two beam pairs from the plurality of beam pairs having the SINR property, and such that reporting the repetition set-specific transmit beam identifier of the candidate transmit beam, and the SINR, for each of the two beam pairs includes reporting the repetition set-specific transmit beam identifier of the candidate transmit beam, and the SINR, for each of the more than two beam pairs.

Additionally, the base station 102 may be configured to perform methods corresponding to methods 1000, 1100, and 1200 to configure the UE 104 and receive L1 SINR group based beam report, and optionally establish multi-beam communications with the UE 104.

In a first option, the base station 102 may perform a method of wireless communication where the measurement configuration indicates a plurality of CMR repetition sets 602 (see FIG. 6) with a number of repetitions corresponding to a total number (N) of candidate transmit (Tx) beams (or transmission configuration indicator (TCI) states). For instance, this first option method is complementary to method 1000 performed by the UE 104. For example, the base station 102 may perform this first option method via execution of beam management component 115 by a processor and/or a memory, which may include the TX processor 316, the RX processor 370, and/or the controller/processor 375 of FIG. 3.

For example, in this first option, the base station 102 may perform a method of wireless communication including transmitting, via the transceiver 318 and/or the transmitter 318TX, a channel measurement resource (CMR) configuration including a plurality of CMR repetition sets equal to a total number of candidate transmit beams, wherein each repetition set of the plurality of repetition sets indicates a repetition set-specific CMR and a repetition set-specific transmit beam identifier of a candidate transmit beam from the total number of candidate transmit beams. In this case, the CMR configuration configures the UE, for each of the plurality of repetition sets, to receive the repetition set-specific CMR at each of a plurality of receive beams, wherein the plurality of receive beams respectively correspond to the total number of candidate transmit beams;

Further, this first option method includes receiving, via the transceiver 318 and/or the receiver 318RX, a report including a repetition set-specific transmit beam identifier and a signal to interference and noise ratio (SINR) for each of two beam pairs that meet a SINR property from among a plurality of beam pairs corresponding to the CMR configuration.

Additionally, this first option method includes transmitting, via the transceiver 318 and/or the transmitter 318TX, signals simultaneously on a first transmit beam and a second transmit beam corresponding to the two beam pairs in the report.

In a second option, the base station 102 may perform a method of wireless communication wherein the measurement configuration indicates N resource sets 702 (see FIG. 7) of 1 CMR resource plus N−1 IMRs, e.g., 1 CMR mapped to N−1 IMRs, wherein N is the number of candidate Tx beams. For instance, this second option method is complementary to method 1100 performed by the UE 104. For example, the base station 102 may perform this second option method via execution of beam management component 115 by a processor and/or a memory, which may include the TX processor 316, the RX processor 370, and/or the controller/processor 375 of FIG. 3.

For example, in this second option, the base station 102 may perform a method of wireless communication including transmitting, via the transceiver 318 and/or the transmitter 318TX, a measurement resource configuration indicating a plurality of resource sets each having a resource set-specific channel measurement resource (CMR) and a plurality of resource set-specific interference measurement resources (IMRs), wherein a number of the plurality of resource sets are equal to a total number of candidate transmit beams, wherein each resource set-specific CMR corresponds to a resource set-specific CMR transmit beam identifier of a plurality of transmit beam identifiers of the total number of candidate transmit beams, wherein the plurality of resource set-specific IMRs correspond to a resource set-specific plurality of remaining transmit beam identifiers of the plurality of transmit beam identifiers.

In this second option, the measurement resource configuration configures the UE to receive, for each of the plurality of resource sets, the resource set-specific CMR and the plurality of resource set-specific IMRs at a resource set-specific receive beam of a plurality of receive beams, wherein each resource set-specific receive beam corresponds to the resource set-specific transmit beam identifier of the candidate transmit beam for each of the plurality of resource sets, wherein the plurality of receive beams respectively correspond to the total number of candidate transmit beams.

Further, in this second option, the method includes receiving, via the transceiver 318 and/or the receiver 318RX, a report including a resource set-specific transmit beam identifier and a signal to interference and noise ratio (SINR) for each of two beam pairs that meet a SINR property from among a plurality of beam pairs corresponding to the measurement resource configuration.

Additionally, in this second option, the method may include transmitting, via the transceiver 318 and/or the transmitter 318TX, signals simultaneously on a first transmit beam and a second transmit beam corresponding to the two beam pairs in the report.

In a third option, the base station 102 may perform a method of wireless communication where the measurement configuration 800 indicates N×(N−1) resource sets of a CMR and an IMR, e.g., 1 CMR mapped to 1 IMR, where N is the number of candidate Tx beams. For instance, this third option method is complementary to method 1200 performed by the UE 104. For example, the base station 102 may perform this third option method via execution of beam management component 115 by a processor and/or a memory, which may include the TX processor 316, the RX processor 370, and/or the controller/processor 375 of FIG. 3.

For example, in this third option, the base station 102 may perform a method of wireless communication including transmitting, via the transceiver 318 and/or the transmitter 318TX, a measurement resource configuration indicating a plurality of resource sets each having a resource set-specific channel measurement resource (CMR) and a resource set-specific interference measurement resources (IMR), wherein a number of the plurality of resource sets are equal to (a total number (N) of candidate transmit beams)×(N−1), wherein each resource set-specific CMR corresponds to a resource set-specific first candidate transmit beam having a resource set-specific first transmit beam identifier of a plurality of transmit beam identifiers of the total number of candidate transmit beams, wherein the resource set-specific IMR corresponds to a resource set-specific second candidate transmit beam having a resource set-specific second transmit beam identifier of the plurality of transmit beam identifiers.

In the case of this third option, the measurement resource configuration configures the UE to receive, for each of the plurality of resource sets, the resource set-specific CMR and the resource set-specific IMR at a resource set-specific first receive beam of a plurality of receive beams, wherein each resource set-specific first receive beam corresponds to the resource set-specific first transmit beam identifier of the resource set-specific first candidate transmit beam for each of the plurality of resource sets, wherein the plurality of receive beams respectively correspond to the total number of candidate transmit beams.

Further, in this third option, the method also includes receiving, via the transceiver 318 and/or the receiver 318RX, a report including a resource set-specific transmit beam identifier and a signal to interference and noise ratio (SINR) for each of two beam pairs that meet a SINR property from among a plurality of beam pairs corresponding to the measurement resource configuration.

Additionally, in this third option, the method may include transmitting, via the transceiver 318 and/or the transmitter 318TX, signals simultaneously on a first transmit beam and a second transmit beam corresponding to the two beam pairs in the report.

In an additional option, for L1-SINR based group reporting, the base station configures multiple candidate beam groups, among which UE reports beam group(s) such that the two beams per group can be received simultaneously. Specifically, the corresponding CMR/IMR per beam in each candidate group is configured such that the reported L1-SINR per beam reflects cross-beam interference from the other beam in the group.

Implementation examples are described in the following numbered clauses:

1. A method of wireless communication at a UE, comprising:
receiving a CMR configuration including a plurality of CMR repetition sets equal to a total number of candidate transmit beams, wherein each CMR repetition set of the plurality of CMR repetition sets indicates a repetition set-specific CMR and a repetition set-specific transmit beam identifier of a candidate transmit beam from the total number of candidate transmit beams;
measuring a received power of the repetition set-specific CMR at each of a plurality of receive beams for each of the plurality of CMR repetition sets, wherein the plurality of receive beams respectively correspond to the total number of candidate transmit beams;
determining a SINR for each of a plurality of beam pairs of the total number of candidate transmit beams and the plurality of receive beams, based on the received power of the repetition set-specific CMR at each of the plurality of receive beams for each of the plurality of CMR repetition sets;
selecting two beam pairs from the plurality of beam pairs having a SINR property; and
reporting the repetition set-specific transmit beam identifier of the candidate transmit beam, and the SINR, for each of the two beam pairs.

2. The method of clause 1, wherein the SINR property comprises one of:
a first minimum of each SINR for the two beam pairs is maximized among the plurality of beam pairs;
a second minimum of each SINR for the two beam pairs is greater than a SINR threshold;
a third minimum of each SINR for the two beam pairs configured to reflect cross-beam interference from another beam pair of the two beam pairs;
a first maximum of a sum throughput SINR;
a second maximum of an average SINR;
a third maximum of a fairness metric; or
any combination of thereof.

3. The method of clause 1 or 2, wherein the SINR property is when the two beam pairs are simultaneously received by the UE.

4. The method of any preceding clause 1 to 3, wherein each repetition set-specific transmit beam identifier comprises a CMR identifier, a CMR repetition set identifier, or a transmission configuration indicator state identifier.

5. The method of any preceding clause 1 to 4, wherein receiving the CMR configuration further comprises receiving a channel state information report configuration message having a report quantity set to a SINR value.

6. The method of any preceding clause 1 to 5, wherein selecting the two beam pairs from the plurality of beam pairs having the SINR property includes selecting more than two beam pairs from the plurality of beam pairs having the SINR property; and
wherein reporting the repetition set-specific transmit beam identifier of the candidate transmit beam, and the SINR, for each of the two beam pairs includes reporting the repetition set-specific transmit beam identifier of the candidate transmit beam, and the SINR, for each of the more than two beam pairs.

7. An apparatus for wireless communication at a UE, comprising a memory, a transceiver, and a processor, coupled with the memory and the transceiver, and configured to perform one or more methods of any preceding clause 1 to 6.

8. An apparatus for wireless communication at a UE, comprising means for performing one or more methods of any preceding clause 1 to 6.

9. A computer-readable medium storing instructions for wireless communication at a UE, executable by a processor, to perform one or more methods of any preceding clause 1 to 6.

10. A method of wireless communication at a base station, comprising:
transmitting a CMR configuration including a plurality of CMR repetition sets equal to a total number of candidate transmit beams, wherein each CMR repetition set of the plurality of CMR repetition sets indicates a repetition set-specific CMR and a repetition set-specific transmit beam identifier of a candidate transmit beam from the total number of candidate transmit beams;
wherein the CMR configuration configures a UE, for each of the plurality of CMR repetition sets, to receive the repetition set-specific CMR at each of a plurality of receive beams, wherein the plurality of receive beams respectively correspond to the total number of candidate transmit beams;
receiving a report including a repetition set-specific transmit beam identifier and a SINR for each of two beam pairs that meet a SINR property from among a plurality of beam pairs corresponding to the CMR configuration; and
transmitting signals simultaneously on a first transmit beam and a second transmit beam corresponding to the two beam pairs in the report.

11. A method of wireless communication at a UE, comprising:
receiving a measurement resource configuration indicating a plurality of resource sets each having a resource set-specific CMR and a plurality of resource set-specific IMRs, wherein a number of the plurality of resource sets are equal to a total number of candidate transmit beams, wherein each resource set-specific CMR corresponds to a resource set-specific CMR transmit beam identifier of a plurality of transmit beam identifiers of the total number of candidate transmit beams, wherein the plurality of resource set-specific IMRs correspond to a resource set-specific plurality of remaining transmit beam identifiers of the plurality of transmit beam identifiers;

measuring a received power of the resource set-specific CMR and of the plurality of resource set-specific IMRs at a resource set-specific receive beam of a plurality of receive beams for each of the plurality of resource sets, wherein each resource set-specific receive beam corresponds to the resource set-specific transmit beam identifier of the candidate transmit beam for each of the plurality of resource sets, wherein the plurality of receive beams respectively correspond to the total number of candidate transmit beams;

determining a SINR for each of a plurality of beam pairs of the resource set-specific transmit beam and the plurality of remaining transmit beams for each of the plurality of resource sets, based on the received power of the resource set-specific CMR and of the plurality of resource set-specific IMRs for each of the plurality of resource sets;

selecting two beam pairs from the plurality of beam pairs having a SINR property; and reporting the resource set-specific CMR transmit beam identifier and the SINR for each of the two beam pairs.

12. The method of clause 11, wherein the SINR property comprises one of:

a first minimum of each SINR for the two beam pairs is maximized among the plurality of beam pairs;

a second minimum of each SINR for the two beam pairs is greater than a SINR threshold;

a third minimum of each SINR for the two beam pairs configured to reflect cross-beam interference from another beam pair of the two beam pairs;

a first maximum of a sum throughput SINR;

a second maximum of an average SINR;

a third maximum of a fairness metric; or any combination of thereof.

13. The method of clause 11 or 12, wherein the SINR property is when the two beam pairs are simultaneously received by the UE.

14. The method of any preceding clause 11 to 13, wherein each resource set-specific CMR transmit beam identifier comprises a CMR identifier, a resource set identifier, or a transmission configuration indicator state identifier.

15. The method of any preceding clause 11 to 14, wherein receiving the measurement resource configuration further comprises receiving a channel state information report configuration message having a report quantity set to a SINR value.

16. The method of any preceding clause 11 to 15, further comprising determining, for each of the plurality of resource sets, a remaining transmit beam identifier of the resource set-specific plurality of remaining transmit beam identifiers for each of the plurality of resource set-specific IMRs based on an IMR ordering or based the resource set-specific CMR transmit beam identifier associated with the IMR.

17. An apparatus for wireless communication at a UE, comprising a memory, a transceiver, and a processor, coupled with the memory and the transceiver, and configured to perform one or more methods of any preceding clause 11 to 16.

18. An apparatus for wireless communication at a UE, comprising means for performing one or more methods of any preceding clause 11 to 16.

19. A computer-readable medium storing instructions for wireless communication at a UE, executable by a processor, to perform one or more methods of any preceding clause 11 to 16.

20. A method of wireless communication at a base station, comprising:

transmitting a measurement resource configuration indicating a plurality of resource sets each having a resource set-specific CMR and a plurality of resource set-specific Milts, wherein a number of the plurality of resource sets are equal to a total number of candidate transmit beams, wherein each resource set-specific CMR corresponds to a resource set-specific CMR transmit beam identifier of a plurality of transmit beam identifiers of the total number of candidate transmit beams, wherein the plurality of resource set-specific Milts correspond to a resource set-specific plurality of remaining transmit beam identifiers of the plurality of transmit beam identifiers;

wherein the measurement resource configuration configures a UE to receive, for each of the plurality of resource sets, the resource set-specific CMR and the plurality of resource set-specific IMRs at a resource set-specific receive beam of a plurality of receive beams, wherein each resource set-specific receive beam corresponds to the resource set-specific transmit beam identifier of the candidate transmit beam for each of the plurality of resource sets, wherein the plurality of receive beams respectively correspond to the total number of candidate transmit beams;

receiving a report including a resource set-specific transmit beam identifier and a SINR for each of two beam pairs that meet a SINR property from among a plurality of beam pairs corresponding to the measurement resource configuration; and transmitting signals simultaneously on a first transmit beam and a second transmit beam corresponding to the two beam pairs in the report.

21. A method of wireless communication at a UE, comprising:

receiving a measurement resource configuration indicating a plurality of resource sets each having a resource set-specific CMR and a resource set-specific IMR, wherein a number of the plurality of resource sets are equal to (a total number (N) of candidate transmit beams)×(N−1), wherein each resource set-specific CMR corresponds to a resource set-specific first candidate transmit beam having a resource set-specific first transmit beam identifier of a plurality of transmit beam identifiers of the total number of candidate transmit beams, wherein the resource set-specific IMR corresponds to a resource set-specific second candidate transmit beam having a resource set-specific second transmit beam identifier of the plurality of transmit beam identifiers;

measuring, for each of the plurality of resource sets, a received power of the resource set-specific CMR and a received power of the resource set-specific IMR at a resource set-specific first receive beam of a plurality of receive beams, wherein each resource set-specific first receive beam corresponds to the resource set-specific first transmit beam identifier of the resource set-specific first candidate transmit beam for each of the plurality of resource sets, wherein the plurality of receive beams respectively correspond to the total number of candidate transmit beams;

determining, for each of the plurality of resource sets, a SINR for each of a plurality of beam pairs of the resource set-specific first transmit beam and the resource set-specific second transmit beam, based on the received power of the resource set-specific CMR at the resource set-specific first receive beam and based on the received power of the resource set-specific IMR at the resource set-specific first receive beam for each of the plurality of resource sets;

selecting two beam pairs from the plurality of beam pairs having a SINR property; and reporting the resource set-specific transmit beam identifier and the SINR for each of the two beam pairs.

22. The method of clause 21, wherein the SINR property comprises:
a first minimum of each SINR for the two beam pairs is maximized among the plurality of beam pairs;
a second minimum of each SINR for the two beam pairs is greater than a SINR threshold;
a third minimum of each SINR for the two beam pairs configured to reflect cross-beam interference from another beam pair of the two beam pairs;
a first maximum of a sum throughput SINR;
a second maximum of an average SINR;
a third maximum of a fairness metric; or
any combination of thereof.

23. The method of clause 21 or 22, wherein the SINR property is when the two beam pairs are simultaneously received by the UE.

24. The method of any preceding clause 21 to 23, wherein each resource set-specific CMR transmit beam identifier comprises a CMR identifier, a resource set identifier, or a transmission configuration indicator state identifier.

25. The method of any preceding clause 21 to 24, wherein receiving the measurement resource configuration further comprises receiving a channel state information report configuration message having a report quantity set to a SINR value.

26. The method of any preceding clause 21 to 25, further comprising determining, for each of the plurality of resource sets, the resource set-specific second transmit beam identifier for each resource set-specific IMR based on an IMR ordering or based the resource set-specific first transmit beam identifier of the resource set-specific CMR associated with the resource set-specific IMR.

27. The method of any preceding clause 21 to 26, wherein selecting two beam pairs from the plurality of beam pairs having the SINR property includes selecting more than two beam pairs from the plurality of beam pairs having the SINR property; and
wherein reporting the resource set-specific transmit beam identifier of the candidate transmit beam, and the SINR, for each of the two beam pairs includes reporting the resource set-specific transmit beam identifier of the candidate transmit beam, and the SINR, for each of the more than two beam pairs.

28. An apparatus for wireless communication at a UE, comprising a memory, a transceiver, and a processor, coupled with the memory and the transceiver, and configured to perform one or more methods of any preceding clause 21 to 27.

29. An apparatus for wireless communication at a UE, comprising means for performing one or more methods of any preceding clause 21 to 27.

30. A computer-readable medium storing instructions for wireless communication at a UE, executable by a processor, to perform one or more methods of any preceding clause 21 to 27.

31. A method of wireless communication at a base station, comprising:
transmitting a measurement resource configuration indicating a plurality of resource sets each having a resource set-specific CMR and a resource set-specific IMR, wherein a number of the plurality of resource sets are equal to (a total number (N) of candidate transmit beams)×(N−1), wherein each resource set-specific CMR corresponds to a resource set-specific first candidate transmit beam having a resource set-specific first transmit beam identifier of a plurality of transmit beam identifiers of the total number of candidate transmit beams, wherein the resource set-specific IMR corresponds to a resource set-specific second candidate transmit beam having a resource set-specific second transmit beam identifier of the plurality of transmit beam identifiers;
wherein the measurement resource configuration configures the UE to receive, for each of the plurality of resource sets, the resource set-specific CMR and the resource set-specific IMR at a resource set-specific first receive beam of a plurality of receive beams, wherein each resource set-specific first receive beam corresponds to the resource set-specific first transmit beam identifier of the resource set-specific first candidate transmit beam for each of the plurality of resource sets, wherein the plurality of receive beams respectively correspond to the total number of candidate transmit beams;
receiving a report including a resource set-specific transmit beam identifier and a SINR for each of two beam pairs that meet a SINR property from among a plurality of beam pairs corresponding to the measurement resource configuration; and
transmitting signals simultaneously on a first transmit beam and a second transmit beam corresponding to the two beam pairs in the report.

32. An apparatus for wireless communication at a base station, comprising a memory, a transceiver, and a processor, coupled with the memory and the transceiver, and configured to perform one or more methods of any of clauses 10, 20, and 31.

33. An apparatus for wireless communication at a base station, comprising means for performing one or more methods of any of clauses 10, 20, and 31.

34. A computer-readable medium storing instructions for wireless communication at a base station, executable by a processor, to perform one or more methods of any of clauses 10, 20, and 31.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   receiving a channel measurement resource (CMR) configuration including a plurality of CMR repetition sets equal to a total number of candidate transmit beams, wherein each CMR repetition set of the plurality of CMR repetition sets indicates a repetition set-specific CMR and a repetition set-specific transmit beam identifier of a candidate transmit beam from the total number of candidate transmit beams;
   measuring a received power of the repetition set-specific CMR at each of a plurality of receive beams for each of the plurality of CMR repetition sets, wherein the plurality of receive beams respectively correspond to the total number of candidate transmit beams;
   determining a signal to interference and noise ratio (SINR) for each of a plurality of beam pairs of the total number of candidate transmit beams and the plurality of receive beams, based on the received power of the repetition set-specific CMR at each of the plurality of receive beams for each of the plurality of CMR repetition sets;
   selecting two beam pairs from the plurality of beam pairs having a SINR property; and
   reporting the repetition set-specific transmit beam identifier of the candidate transmit beam, and the SINR, for each of the two beam pairs.

2. The method of claim 1, wherein the SINR property comprises one of:
   a first minimum of each SINR for the two beam pairs is maximized among the plurality of beam pairs;
   a second minimum of each SINR for the two beam pairs is greater than a SINR threshold;
   a third minimum of each SINR for the two beam pairs configured to reflect cross-beam interference from another beam pair of the two beam pairs;
   a first maximum of a sum throughput SINR;
   a second maximum of an average SINR;
   a third maximum of a fairness metric; or
   any combination of thereof.

3. The method of claim 2, wherein the SINR property is when the two beam pairs are simultaneously received by the UE.

4. The method of claim 1, wherein each repetition set-specific transmit beam identifier comprises a CMR identifier, a CMR repetition set identifier, or a transmission configuration indicator state identifier.

5. The method of claim 1, wherein receiving the CMR configuration further comprises receiving a channel state information report configuration message having a report quantity set to a SINR value.

6. The method of claim 1, wherein selecting the two beam pairs from the plurality of beam pairs having the SINR property includes selecting more than two beam pairs from the plurality of beam pairs having the SINR property; and
   wherein reporting the repetition set-specific transmit beam identifier of the candidate transmit beam, and the SINR, for each of the two beam pairs includes reporting the repetition set-specific transmit beam identifier of the candidate transmit beam, and the SINR, for each of the more than two beam pairs.

7. An apparatus for wireless communication at a user equipment (UE), comprising:
   a memory;
   a transceiver; and
   a processor, coupled with the memory and the transceiver, and configured to:
      receive, via the transceiver, a channel measurement resource (CMR) configuration including a plurality of CMR repetition sets equal to a total number of candidate transmit beams, wherein each CMR repetition set of the plurality of CMR repetition sets indicates a repetition set-specific CMR and a repetition set-specific transmit beam identifier of a candidate transmit beam from the total number of candidate transmit beams;
      measure a received power of the repetition set-specific CMR at each of a plurality of receive beams for each of the plurality of CMR repetition sets, wherein the plurality of receive beams respectively correspond to the total number of candidate transmit beams;
      determine a signal to interference and noise ratio (SINR) for each of a plurality of beam pairs of the total number of candidate transmit beams and the plurality of receive beams, based on the received power of the repetition set-specific CMR at each of the plurality of receive beams for each of the plurality of CMR repetition sets;
      select two beam pairs from the plurality of beam pairs having a SINR property; and
      report, via the transceiver, the repetition set-specific transmit beam identifier of the candidate transmit beam, and the SINR, for each of the two beam pairs.

8. The apparatus of claim 7, wherein the SINR property comprises one of:
   a first minimum of each SINR for the two beam pairs is maximized among the plurality of beam pairs;
   a second minimum of each SINR for the two beam pairs is greater than a SINR threshold;
   a third minimum of each SINR for the two beam pairs configured to reflect cross-beam interference from another beam pair of the two beam pairs;
   a first maximum of a sum throughput SINR;
   a second maximum of an average SINR;
   a third maximum of a fairness metric; or
   any combination of thereof.

9. The apparatus of claim 8, wherein the SINR property is when the two beam pairs are simultaneously received by the UE.

10. The apparatus of claim 7, wherein each repetition set-specific transmit beam identifier comprises a CMR identifier, a CMR repetition set identifier, or a transmission configuration indicator state identifier.

11. The apparatus of claim 7, wherein to receive the CMR configuration the processor is further configured to receive, via the transceiver, a channel state information report configuration message having a report quantity set to a SINR value.

12. The apparatus of claim 7, wherein to select two beam pairs from the plurality of beam pairs having the SINR property includes to select more than two beam pairs from the plurality of beam pairs having the SINR property; and
wherein to report the repetition set-specific transmit beam identifier of the candidate transmit beam, and the SINR, for each of the two beam pairs includes reporting, via the transceiver, the repetition set-specific transmit beam identifier of the candidate transmit beam, and the SINR, for each of the more than two beam pairs.

13. A method of wireless communication at a user equipment (UE), comprising:
receiving a measurement resource configuration indicating a plurality of resource sets each having a resource set-specific channel measurement resource (CMR) and a plurality of resource set-specific interference measurement resources (IMRs), wherein a number of the plurality of resource sets are equal to a total number of candidate transmit beams, wherein each resource set-specific CMR corresponds to a resource set-specific CMR transmit beam identifier of a plurality of transmit beam identifiers of the total number of candidate transmit beams, wherein the plurality of resource set-specific IMRs correspond to a resource set-specific plurality of remaining transmit beam identifiers of the plurality of transmit beam identifiers;
measuring a received power of the resource set-specific CMR and of the plurality of resource set-specific IMRs at a resource set-specific receive beam of a plurality of receive beams for each of the plurality of resource sets, wherein each resource set-specific receive beam corresponds to the resource set-specific transmit beam identifier of the candidate transmit beam for each of the plurality of resource sets, wherein the plurality of receive beams respectively correspond to the total number of candidate transmit beams;
determining a signal to interference and noise ratio (SINR) for each of a plurality of beam pairs of the resource set-specific transmit beam and the plurality of remaining transmit beams for each of the plurality of resource sets, based on the received power of the resource set-specific CMR and of the plurality of resource set-specific IMRs for each of the plurality of resource sets;
selecting two beam pairs from the plurality of beam pairs having a SINR property; and
reporting the resource set-specific CMR transmit beam identifier and the SINR for each of the two beam pairs.

14. The method of claim 13, wherein the SINR property comprises one of:
a first minimum of each SINR for the two beam pairs is maximized among the plurality of beam pairs;
a second minimum of each SINR for the two beam pairs is greater than a SINR threshold;
a third minimum of each SINR for the two beam pairs configured to reflect cross-beam interference from another beam pair of the two beam pairs;
a first maximum of a sum throughput SINR;
a second maximum of an average SINR;
a third maximum of a fairness metric; or
any combination of thereof.

15. The method of claim 14, wherein the SINR property is when the two beam pairs are simultaneously received by the UE.

16. The method of claim 13, wherein each resource set-specific CMR transmit beam identifier comprises a CMR identifier, a resource set identifier, or a transmission configuration indicator state identifier.

17. The method of claim 13, wherein receiving the measurement resource configuration further comprises receiving a channel state information report configuration message having a report quantity set to a SINR value.

18. The method of claim 13, further comprising determining, for each of the plurality of resource sets, a remaining transmit beam identifier of the resource set-specific plurality of remaining transmit beam identifiers for each of the plurality of resource set-specific IMRs based on an IMR ordering or based the resource set-specific CMR transmit beam identifier associated with the IMR.

19. A method of wireless communication at a user equipment (UE), comprising:
receiving a measurement resource configuration indicating a plurality of resource sets each having a resource set-specific channel measurement resource (CMR) and a resource set-specific interference measurement resources (IMR), wherein a number of the plurality of resource sets are equal to (a total number (N) of candidate transmit beams)×(N−1), wherein each resource set-specific CMR corresponds to a resource set-specific first candidate transmit beam having a resource set-specific first transmit beam identifier of a plurality of transmit beam identifiers of the total number of candidate transmit beams, wherein the resource set-specific IMR corresponds to a resource set-specific second candidate transmit beam having a resource set-specific second transmit beam identifier of the plurality of transmit beam identifiers;
measuring, for each of the plurality of resource sets, a received power of the resource set-specific CMR and a received power of the resource set-specific IMR at a resource set-specific first receive beam of a plurality of receive beams, wherein each resource set-specific first receive beam corresponds to the resource set-specific first transmit beam identifier of the resource set-specific first candidate transmit beam for each of the plurality of resource sets, wherein the plurality of receive beams respectively correspond to the total number of candidate transmit beams;
determining, for each of the plurality of resource sets, a signal to interference and noise ratio (SINR) for each of a plurality of beam pairs of the resource set-specific first transmit beam and the resource set-specific second transmit beam, based on the received power of the resource set-specific CMR at the resource set-specific first receive beam and based on the received power of the resource set-specific IMR at the resource set-specific first receive beam for each of the plurality of resource sets;
selecting two beam pairs from the plurality of beam pairs having a SINR property; and
reporting the resource set-specific transmit beam identifier and the SINR for each of the two beam pairs.

20. The method of claim 19, wherein the SINR property comprises:
a first minimum of each SINR for the two beam pairs is maximized among the plurality of beam pairs;
a second minimum of each SINR for the two beam pairs is greater than a SINR threshold;

a third minimum of each SINR for the two beam pairs configured to reflect cross-beam interference from another beam pair of the two beam pairs;
a first maximum of a sum throughput SINR;
a second maximum of an average SINR;
a third maximum of a fairness metric; or
any combination of thereof.

21. The method of claim 20, wherein the SINR property is when the two beam pairs are simultaneously received by the UE.

22. The method of claim 19, wherein each resource set-specific CMR transmit beam identifier comprises a CMR identifier, a resource set identifier, or a transmission configuration indicator state identifier.

23. The method of claim 19, wherein receiving the measurement resource configuration further comprises receiving a channel state information report configuration message having a report quantity set to a SINR value.

24. The method of claim 19, further comprising determining, for each of the plurality of resource sets, the resource set-specific second transmit beam identifier for each resource set-specific IMR based on an IMR ordering or based the resource set-specific first transmit beam identifier of the resource set-specific CMR associated with the resource set-specific IMR.

25. The method of claim 19, wherein selecting two beam pairs from the plurality of beam pairs having the SINR property includes selecting more than two beam pairs from the plurality of beam pairs having the SINR property; and
wherein reporting the resource set-specific transmit beam identifier of the candidate transmit beam, and the SINR, for each of the two beam pairs includes reporting the resource set-specific transmit beam identifier of the candidate transmit beam, and the SINR, for each of the more than two beam pairs.

* * * * *